US010230519B2

(12) United States Patent
Chapman et al.

(10) Patent No.: US 10,230,519 B2
(45) Date of Patent: Mar. 12, 2019

(54) FULL DUPLEX RESOURCE ALLOCATION IN CABLE NETWORK ENVIRONMENT

(71) Applicant: CISCO TECHNOLOGY, INC., San Jose, CA (US)

(72) Inventors: John T. Chapman, Coto de Caza, CA (US); Hang Jin, Plano, TX (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/483,260

(22) Filed: Apr. 10, 2017

(65) Prior Publication Data

US 2018/0294941 A1 Oct. 11, 2018

(51) Int. Cl.
| | |
|---|---|
| *H04L 5/14* | (2006.01) |
| *H04L 5/00* | (2006.01) |
| *H04L 12/917* | (2013.01) |
| *H04L 12/911* | (2013.01) |
| *H04B 3/52* | (2006.01) |

(52) U.S. Cl.
CPC .............. *H04L 5/14* (2013.01); *H04L 5/003* (2013.01); *H04L 5/0039* (2013.01); *H04L 47/76* (2013.01); *H04L 47/781* (2013.01); *H04B 3/52* (2013.01)

(58) Field of Classification Search
CPC .... H04L 5/16; H04L 5/14; H04B 3/52; H04B 3/20
See application file for complete search history.

(56) References Cited

U.S. PATENT DOCUMENTS

| | | |
|---|---|---|
| 6,912,209 B1 | 6/2005 | Thi et al. |
| 7,856,049 B2 | 12/2010 | Currivan et al. |
| 8,457,584 B2 | 6/2013 | Currivan |
| 8,565,266 B1 | 10/2013 | Fox et al. |
| 8,594,118 B2 | 11/2013 | Cooper et al. |
| 9,031,409 B2 | 5/2015 | Nandiraju et al. |
| 8,937,992 B2 | 6/2015 | Cooper et al. |
| 9,136,943 B2 | 9/2015 | Thompson et al. |
| 9,160,463 B2 | 10/2015 | Hunter |
| 9,942,024 B2 * | 4/2018 | Jin ............................ H04L 5/14 |
| 2002/0058513 A1* | 5/2002 | Klein ..................... H04W 16/02 455/447 |

(Continued)

*Primary Examiner* — Hoon J Chung
(74) *Attorney, Agent, or Firm* — Merchant & Gould P.C.

(57) ABSTRACT

An example apparatus comprises a processor, a memory element, and a media access control (MAC) scheduler. The MAC scheduler is configured to implement a transmission-reception (T-R) coordination scheme among a plurality of cable modems in a cable network, wherein the cable modems are categorized into interference groups. The MAC scheduler is further configured to assign one or more of the interference groups to at least one transmission group based upon predetermined criteria; and determine an upstream bandwidth constraint and downstream bandwidth constraint for the at least one transmission group, wherein the upstream bandwidth constraint and downstream bandwidth constraint is implemented by proportionally modifying an allocated upstream bandwidth and an allocated downstream bandwidth for the at least one transmission group to require that the sum of the allocated upstream bandwidth and the allocated downstream bandwidth does not exceed a spectrum capacity for the at least one transmission group.

20 Claims, 21 Drawing Sheets

(56) References Cited

U.S. PATENT DOCUMENTS

| | | | |
|---|---|---|---|
| 2017/0019146 A1* | 1/2017 | Jin | H04B 1/0475 |
| 2017/0019239 A1* | 1/2017 | Jin | H04L 1/004 |
| 2017/0019241 A1* | 1/2017 | Jin | H04L 5/1461 |
| 2017/0019242 A1* | 1/2017 | Jin | H04L 5/1461 |
| 2018/0076910 A1* | 3/2018 | Zhang | H04B 17/24 |

* cited by examiner

US 10,230,519 B2

FULL DUPLEX RESOURCE ALLOCATION IN CABLE NETWORK ENVIRONMENT

TECHNICAL FIELD

This disclosure relates in general to the field of communications and, more particularly, to full duplex resource allocation in cable network environment.

BACKGROUND

Consumer appetite for bandwidth continues to grow exponentially in the cable network market. In some cable network architectures, including remote physical layer (RPHY) with digital fiber, the coax cable becomes the bottleneck in throughput, stifling increase in bandwidth. The typical multi-system operator (MSO) is out of options currently, due to the inherent technological limitations of existing cable network components. For example, the Shannon channel capacity limit (e.g., tight upper bound on rate at which information can be reliably transmitted over a communications channel) has practically been achieved already in existing cable network architectures. There is consumer driven demand to extend the frequency spectrum beyond 1.2 GHz, but a conventional extension would require extensive network upgrade. Upgrades in network components are limited by capital expenditure (CAPEX) budget limitations. All optics (fiber to the home (FTTH) have excessive CAPEX. In such scenarios, it may be desirable to offer new services with full downstream/upstream (DS/US) throughput (e.g., matching Gigabit-capable Passive Optical Networks (GPON) standard of 2.5 Gbits downstream/1 Gbits upstream ratio) with limited capital expenditure for outside plant upgrade.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example apparatus in a cable network includes a processor; a memory element; and a media access control (MAC) scheduler, wherein the MAC scheduler is configured to implement a transmission-reception (T-R) coordination scheme among a plurality of cable modems in the cable network, wherein according to the T-R coordination scheme, the cable modems are categorized into interference groups, wherein no cable modem of any one interference group transmits upstream in a frequency range simultaneously as another cable modem in the same interference group receives downstream in the frequency range, facilitating full duplex communication in the cable network across the frequency range. The MAC scheduler is further configured to assign one or more of the interference groups to at least one transmission group based upon predetermined criteria, and determine an upstream bandwidth constraint and downstream bandwidth constraint for the at least one transmission group, wherein the upstream bandwidth constraint and downstream bandwidth constraint is implemented by proportionally modifying an allocated upstream bandwidth and an allocated downstream bandwidth for the at least one transmission group to require that the sum of the allocated upstream bandwidth and allocated downstream bandwidth does not exceed a simplex spectrum capacity for the at least one transmission group.

Example Embodiments

Figure 1A:
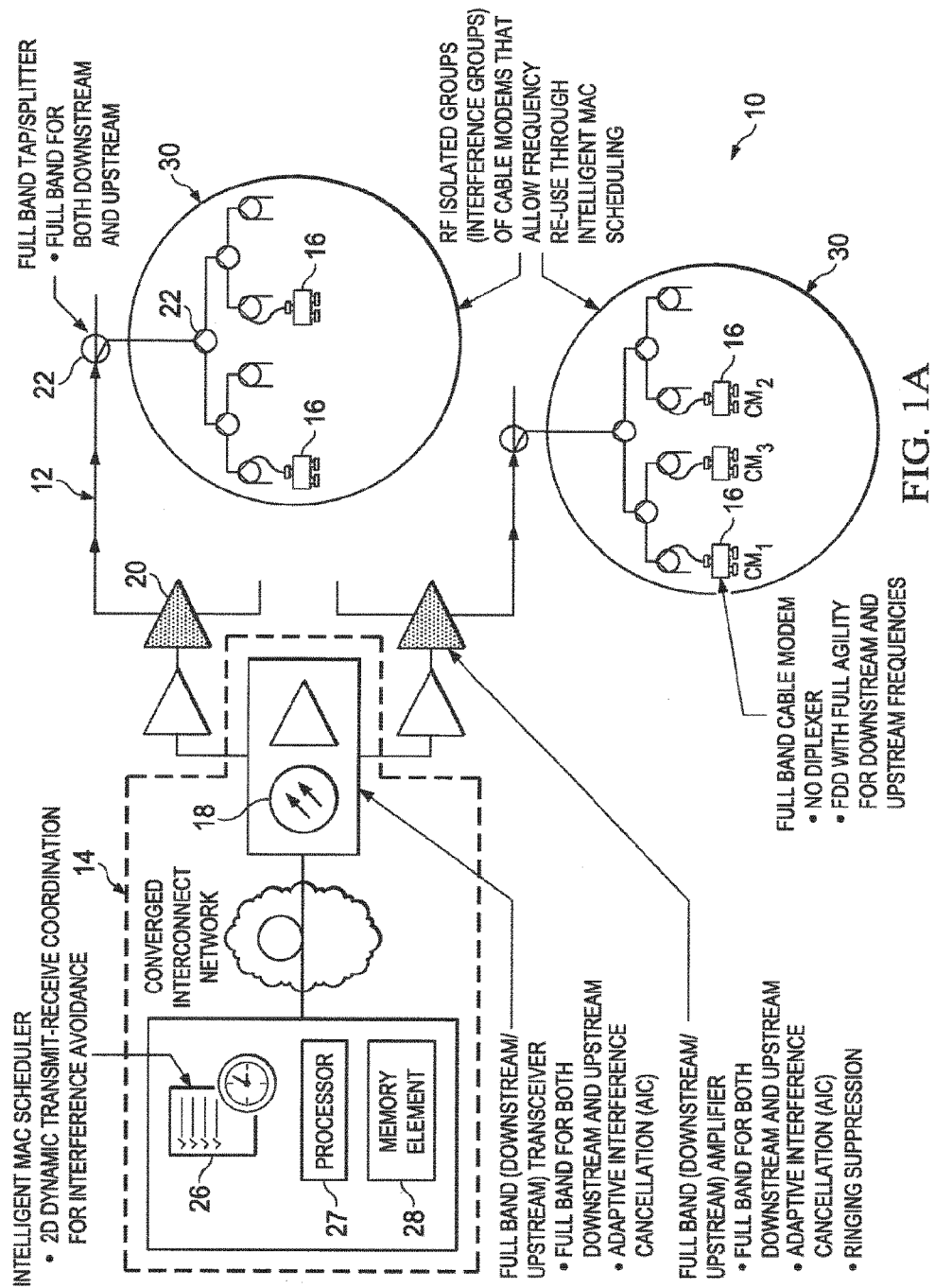
FIG. 1A is a simplified block diagram illustrating a communication system comprising a full duplex network architecture in cable network environments.

Turning to FIG. 1A, FIG. 1A is a simplified block diagram illustrating a communication system 10 enabling full duplex network communication in cable network environments in accordance with one example embodiment. FIG. 1 illustrates a cable network 12 (indicated generally by an arrow) facilitating full duplex communication between a cable modem termination system (CMTS) 14 and one or more cable modems (CMs) 16. Network 12 includes transceivers 18, amplifiers 20, and taps and splitters 22. CMTS 14 includes an intelligent media access control (MAC) scheduler 26 that enables a two-dimensional transmission-reception (T-R) coordination for interference avoidance, along with a processor 27 and a memory element 28 that facilitate executing instructions comprised in MAC scheduler 26. In various embodiments, cable modems 16 may be grouped into various interference groups 30 to enable full duplex communication with little to no interference. Groups 30 may comprise radio frequency (RF) isolated groups that allow frequency re-use through intelligent MAC scheduling.

Transceivers 18 enable full band communication for both upstream and downstream network traffic and implement dynamic interference cancellation, also referred to herein as adaptive interference cancellation (AIC). Note that as used herein, the term "upstream" refers to a communication direction from cable modems 16 towards CMTS 14; the term "downstream" refers to a communication direction from CMTS 14 towards cable modems 16. Amplifiers 20 enable full band communication for both upstream and downstream network traffic, and implement AIC with ringing (e.g., echo) suppression. Taps and splitters 22 may enable full band communication for downstream and upstream traffic.

Each of cable modems 16 supports full band communication, but operates in simplex mode for upstream or downstream transmission. For example, each of cable modems 16 may be assigned non-overlapping frequency bands for upstream and downstream communication, yet the same set of carriers can be used for the downstream and upstream communication, yielding a doubling of throughput compared to currently existing non-full duplex systems. Communication system 10 can enable higher bandwidth (e.g., bandwidth is the maximum amount of data that can travel through a communication channel) and throughput (e.g., throughput refers to the quantity of data that actually does travel through the communication channel successfully) through full-duplex communication.

To explain generally, bandwidth limitations are solved in some communication networks through duplex communication. In a general sense, duplex communication is bidirectional, allowing both end nodes of a communication channel to send and receive data simultaneously. Both end nodes have the ability to operate as sender and receiver at the same time, or take turns sending or receiving data. Duplex-based systems typically have dual communication channels that provide separate medium (e.g., paths) for upstream (US) (e.g., uplink, outgoing, transmitting) and downstream (DS) (e.g., downlink, incoming, receiving) communication. In full duplex mode, the node sends and receives signals simultaneously on the same frequency range.

Examples of communication techniques include frequency division duplexing (FDD) and time division duplexing (TDD). In FDD, separate frequency bands (e.g., carrier frequencies) are used at the transmitter and receiver. Because FDD uses different frequency bands for upstream and downstream operations, the upstream and downstream communication do not interfere with each other. Examples of FDD systems include the following: data over cable service (DOCSIS), asymmetric digital subscriber line (ADSL) and very-high-bitrate digital subscriber line (VDSL); cellular systems, including UMTS/WCDMA Frequency Division Duplexing mode and the CDMA2000 system; IEEE 802.16 WiMax Frequency Division Duplexing mode.

In TDD, the upstream communication is separated from the downstream communication by allocation of different time slots in the same frequency range. For example, users, such as user equipment in LTE-TDD system, are allocated time slots for upstream transmission and downstream reception. TDD allows asymmetric flow for upstream and downstream data transmission. TDD is advantageous in cases where upstream and downstream data rates are asymmetric. The capacities of downstream communication links and upstream communication links are altered in favor of one direction over another by providing greater time allocation through time slots to downstream reception intervals than to upstream transmission intervals.

Full duplex communication mechanisms that allow simultaneous upstream and downstream transmission over the same spectrum have not been used in cable networks, because the inherent network architecture and communication protocols do not support such communication mechanisms. For example, cable was first introduced in the United States in the late 1950s. For the next 30 years, nearly every mile of buried cable was half duplex; thus, the network was capable of broadband transmission in the downstream direction, from the head end to the subscriber, but not in the upstream direction—communication from the subscriber back to the head end was possible only via a telephone line. In recent years, cable operators have been investing heavily to upgrade their buried cables from half to full duplex as a necessary first step to capitalize on the demand for integrated data and voice services. However, upstream transmissions continue to be slower than downstream receptions (typically 1.5 to 3 Mbps downstream and 500 Kbps to 2.5 Mbps upstream).

Nevertheless, with a properly configured cable network architecture, such as cable network 12 of communication system 10, full duplex communication can drastically expand available upstream spectrum (e.g., estimated 5 to 10 times upstream capacity increase). Full duplex communication can provide near symmetric downstream and upstream throughput. System capacities (e.g., bandwidth) can improve with full duplex communication. Moreover, full duplex communication may be technology-agnostic and/or standards/agnostic.

However, implementing full duplex in existing cable networks meet with certain challenges. For example, a large transmitted signal coupled back to the receiver due to reflection (e.g., self-interference from the transmit pathway into the receive pathway within one and same transceiver) at any of the network components, including CMTS 14, cable modems 16, transceivers 18, amplifiers 20 and taps and splitters 22 can kill the received signal at the receiver. Moreover, upstream transmit signal from one of cable modems 16 may leak into the downstream pathway of another of cable modems 16, causing interference. Unlike self-interference, such inter-CM interference cannot be removed with mere echo cancellation techniques because the upstream transmit signal is unknown in the downstream pathway.

Embodiments of communication system 10 can resolve such issues by enabling full duplex communication using appropriately configured components and spectrum sharing techniques. Full duplex communication can be successfully implemented by suppressing (e.g., eliminating) transmitted signals that are coupled back to the receiver (e.g., as an echo, as an upstream signal leaking into the downstream pathway and vice versa, etc.). Sufficient transmitted signal cancellation and/or elimination can be achieved by leveraging (among other parameters) state of art devices and digital signal processing technologies, high speed and high performance (e.g., high resolution) analog to digital converters (ADC), powerful devices with more signal processing capability, an AIC scheme, and advanced MAC scheduling for spectrum sharing. In various embodiments, the AIC scheme suppresses at a receiver (of transceiver 18 or amplifier 20 appropriately) a signal transmitted by a transmitter (of transceiver 18 or amplifier 20 appropriately). Further, in addition to the AIC scheme, full band amplifier 20 implements a ringing suppression scheme implementing echo cancellation.

According to embodiments of communication system 10, MAC scheduler 26 implements a two-dimensional transmission-reception (T-R) coordination scheme among cable modems 16 in cable network 12. According to the T-R coordination scheme, cable modems 16 are categorized into interference groups 30, such that no cable modem of any one interference group transmits upstream in a frequency range simultaneously as another cable modem in the same interference group receives downstream in the frequency range, facilitating full duplex communication in cable network 12 across the frequency range. Cable modems 16 operate in simplex mode, while supporting full band operation for downstream reception and upstream transmission. Note that cable modems 16 in different interference groups 30 transmit upstream and receive downstream simultaneously in the frequency range. In various embodiments, CMTS 14 receives and transmits network traffic across the entire frequency range, facilitating full duplex communication in cable network 12. In some embodiments, cable modems 16 are classified into interference groups 30 through a IG Discovery process.

In some embodiments, MAC scheduler 26 implements the T-R coordination centrally in cable network 12. To explain in further detail, the available frequency spectrum of communication system 10 is divided into frequency resource blocks, comprising a band of adjacent frequencies (e.g., contiguous sub-carriers). OFDM symbols in time space are grouped into the resource blocks in frequency space. According to the centrally implemented T-R coordination scheme, MAC scheduler 26 partitions resource blocks available to any one interference group into at least a first portion and a second portion; the first portion is reserved for upstream transmission, and the second portion is reserved for downstream reception, such that the first portion and the second portion do not overlap in time and frequency for any cable modem in the interference group. In other embodiments, MAC scheduler 26 implements the T-R coordination in a distributed manner in cable network 12. According to the distributed T-R coordination scheme, cable modems 16 manage scheduling upstream transmission and downstream reception in any one interference group. MAC scheduler 26 transmits a downstream transmission map ahead of downstream transmission to cable modems 16, and cable modems 16 schedule respective upstream transmission according to the downstream map.

In various embodiments, a cable network operator may upgrade an existing cable network operating in simplex mode to a full duplex mode by adding appropriate components supporting full duplex communication. For example, the cable network operator may implement a method for full duplex communication in cable network 12 by operating MAC scheduler 26 implementing the above-described two-dimensional T-R coordination scheme among cable modems 16, operating full band transceiver 18 implementing the AIC scheme, and operating full band amplifier 20 implementing the AIC scheme and the ringing suppression scheme implementing echo cancellation. The cable network operator may add to cable network 12 one or more taps and splitters 22 that support full band communication in cable network 12.

Figure 1B:
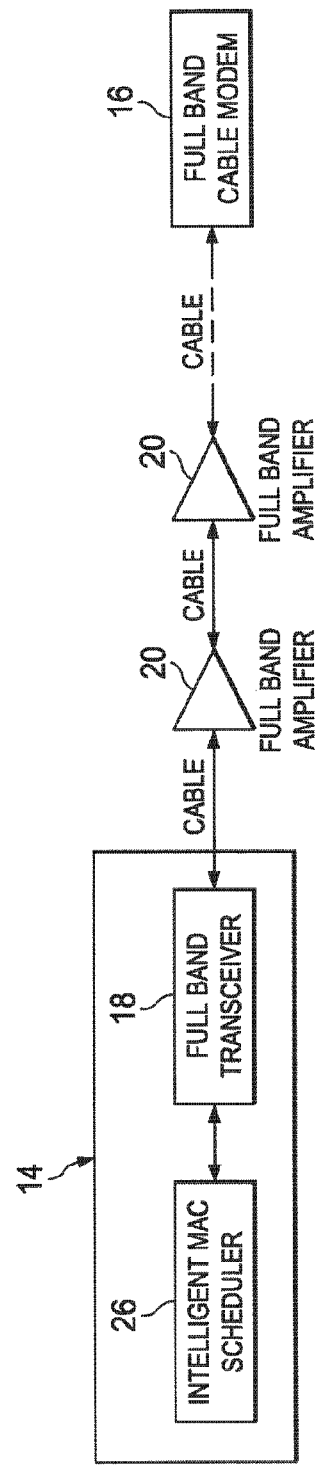
FIG. 1B is a simplified block diagram illustrating example details of embodiments of the communication system.

Moreover, capital expenditure for upgrading to full duplex communication may be reduced by reusing certain components. Turning to FIG. 1B, FIG. 1B shows a simplified diagram illustrating network components of network 12 that may be replaced or added in existing cable networks to enable full duplex communication. Note that in some embodiments, such as N+m architecture with m=0 (e.g., N stands for number of nodes, m stands for number of amplifiers after each node), amplifiers 20 are not used at all. In an example embodiment, a majority (e.g., 97%) of taps and splitters 22 can be re-used for full duplex operation. This may be because standard tap and splitter combiner can operate in full band (e.g., 5-1000 MHz) for both upstream and downstream, supporting full-duplex communication in the supported frequency band. Only a minority (e.g., 3%) of taps and splitters 22 that do not support full band downstream and upstream may have to be replaced for full duplex communication. Likewise, because cable modems 16 are not operating in full duplex mode singly, they may be reused if they support the full band (e.g., they include capability to perform FDD with full agility for upstream and downstream frequencies). Components in network 12 that include diplexers (such as transceivers 18 and amplifiers 20) may have to be replaced entirely to support full duplex communication.

In various embodiments, intelligent MAC scheduling may be used to avoid interference among neighboring cable modems 16. Intelligent MAC scheduling can include: (i) IG Discovery (e.g., measuring and/or monitoring interference among cable modems 16, for example, by establishing interference groups 30), and (ii) T-R coordination (e.g., transmissions and receptions are coordinated through a centric or distributed scheduler to avoid interference among cable modems 16). In some embodiments, the T-R coordination implements a two-dimensional (frequency and time) interference avoidance scheme.

IG Discovery facilitates assigning cable modems 16 to one or more interference groups 30. In some embodiments, during IG Discovery, each of cable modems 16 transmits an interference pattern upstream. For example, the interference pattern could comprise a single tone at one or more frequencies. Other cable modems 16 attempt to receive the interference pattern on their downstream reception frequencies. Different frequencies and/or marked tones for the interference pattern may facilitate many cable modems 16 using the same IG Discovery frequency interval. In some cases, one cable modem may interfere with another, which interferes with a third cable modem, yet the third cable modem may not interfere with the first cable modem. For example, there may be cases in which $CM_1$ interferes with $CM_2$, which interferes with $CM_3$, but $CM_3$ does not interfere with $CM_1$, leading to overlapping interference groups 30. In one example embodiment, such overlapping groups may be lumped into one overarching group, with sub-groups therein.

In some embodiments, one of cable modems 16 may be scheduled to transmit on a specific frequency in a maintenance time window, and other cable modems 16 report their downstream modulation error ratio (MER) or interference level on that frequency to MAC scheduler 26 (or CMTS 14, or other appropriate report receiving module in cable network 12). Based on the reported downstream MER or interference level, a determination may be made as to which cable modems 16 are interfered by the transmitting one of cable modems 16. The interfered cable modems 16 are associated with the transmitting one of cable modems 16 on that frequency in a particular one of interference groups 30. The process may be repeated for various frequencies and cable modems 16. Interference groups 30 may not be updated often. Updating interference groups 30 comprises informing cable modems 16 categorized in respective interference groups 30 as to their membership. Membership of cable modems 16 may change due to various environmental conditions, new cable modem coming online, transmit power changes and other factors. In some embodiments, interference groups 30 may be updated when there are changes to Hybrid fiber-coaxial (HFC); in other embodiments, interference groups 30 may be updated after a predetermined time interval (e.g., 24 hours).

In some embodiments, intelligent MAC scheduler 26 implements static frequency planning for T-R coordination. Spectrum sharing may be implemented through dynamic transmission coordination to avoid interferences. To explain interferences, consider upstream transmission from $CM_1$. The upstream transmission from $CM_1$ may be coupled into $CM_2$ at a common tap-splitter 22 with limited isolation and cause interference with downstream reception at $CM_2$. The interference from $CM_1$ cannot be cancelled out at $CM_2$ as $CM_2$ does not have any reference signal from $CM_1$ (e.g., $CM_2$ cannot determine whether downstream reception at $CM_2$ is from CMTS 14 or from $CM_1$).

To reduce interferences at cable modems 16, a CM frequency planning scheme is implemented in various embodiments. The frequency spectrum used in cable network 12 is divided into multiple frequency ranges that align with channel boundaries. For each one of cable modems 16 and each frequency range, those cable modems 16 are identified whose upstream transmissions interfere with downstream reception of that specific one of cable modems 16, and those cable modems 16 whose downstream receptions are interfered by upstream transmissions of that specific one of cable modems 16, if they operate on that same frequency (as is the case in full duplex communication). MAC scheduler 26 avoids assigning cable modems 16 to frequency ranges that cause interferences among them.

Full duplex communication affects operation of various components of cable network 12, and the implications are different on different components. For example, the implications on CMTS 14 arise in the two areas: (a) full duplex involves CMTS 14 supporting throughputs of full band downstream traffic and upstream traffic (this is mainly a capacity specification to support the throughput); and (b) frequency planning and intelligent MAC scheduling, including establishing interfering/interfered lists according to algorithms described herein, executing frequency planning algorithms and determining frequency assignments, and T-R coordination as appropriate. In some embodiments, such functions can be integrated into MAC scheduler 26 at CMTS 14.

In some embodiments, full duplex communication may involve a major re-design of transceiver 18. Transceiver 18 may be reconfigured by replacing its diplexer with a 2-way combiner-splitter and other modifications. Transceiver 18 may be rewired to support full band operation for both downstream and upstream, and for high capacity to support the throughput of full band downstream and upstream. Transceiver 18 may also be changed to implement AIC algorithms. Other functions to support full duplex include: measuring interferences among cable modems 16 for frequency planning; and measuring cable modem downstream timing and upstream timing for supporting T-R coordination as appropriate.

Although cable modems 16 operate in FDD mode (e.g., downstream reception and upstream transmission on different frequencies in any one cable modem), cable modems 16 support full band FDD operation of both downstream and upstream. Full band FDD means downstream and upstream frequencies can be on any frequencies between 10 MHz to 1000 MHz (1.2 GHz) although they do not overlap each other. This means that cable modems 16 do not include any diplexer. In addition, cable modems 16 have full frequency agility, good RF fidelity (e.g., with minimized guard band between downstream and upstream), and high capacity to support full band throughput (e.g., 500 MHz DS and 500 MHz US).

Amplifier 20 may be subject to a major re-design to support full duplex communication. For example, amplifier 20 may be re-designed with no diplexer, full band operation, and digitized input signal. Interference cancellation blocks including ringing suppression may be added to existing amplification functions. Amplifier 20 implementing a two-step interference cancellation scheme can provide over 50 dB interference suppression and push the interference below the noise floor. However, some signal integrity degradation may be inevitable. For example, if the interference is suppressed to 6 dB below the system noise floor, there may be 1 dB degradation to signal's ratio of signal-to-noise ratio (SNR) to modulation error ratio (MER) (SNR/MER). In some embodiments, the maximum number of the cascaded amplifiers (including trunk, bridge and extender) may be limited to 5 (N+5, max 5 dB degradation at the end of the line), for example, to minimize signal degradation.

The optical link in HFC may be changed to support full duplex operation by providing high capacity for both DS and US to support the high throughput of coaxial network under full duplex. In a general sense, amplifiers in the coax network may be replaced. Devices with built-in diplexer (for example, reverse attenuator) in the coax network may be replaced (3% of taps, according to Cisco CATV market). System gain re-engineering/re-balance may be suitable due to the extended frequencies. Some of the devices may be replaced (with better port-to-port isolation) to enhance isolation among cable modems 16. Occasionally, the coax network may be re-architected to enhance isolation among cable modems 16. For example, an amplifier may be added right before a splitter to create isolated cable modem groups.

Full duplex could significantly increase cable access upstream throughput. An enabler for full duplex is interference cancellation and avoidance. Simulation results show that interference cancellation can be achieved through advanced digital signal processing algorithms. Full duplex is perpendicular to (e.g., orthogonal to, independent of, etc.) cable access technologies and high layer architectures; thus, it can work with any high level protocols and architectures. Full duplex can be used with existing access technology (CABU R-PHY shelf/node and CDBU CM), or as a candidate for next generation DOCSIS access technology. Full duplex is novel and substantial, and has business and technology impacts that may go beyond cable access (wireless, for example).

Turning to the infrastructure of communication system 10, the network topology can include any number of cable modems, customer premises equipment, servers, switches (including distributed virtual switches), routers, amplifiers, taps, splitters, combiners and other nodes inter-connected to form a large and complex network. Network 12 represents a series of points or nodes of interconnected communication pathways for receiving and transmitting packets and/or frames of information that are delivered to communication system 10. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 offers a communicative interface between cable network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 12 may implement any suitable communication protocol for transmitting and receiving data packets within communication system 10. The architecture of the present disclosure may include a configuration capable of DOCSIS, TCP/IP, TDMA, and/or other communications for the electronic transmission or reception of signals in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In particular embodiments, CMTS 14 may comprise a hardware appliance with appropriate ports, processors, memory elements, interfaces, and other electrical and electronic components that facilitate the functions described herein, including providing high speed data services, such as cable Internet or voice over Internet Protocol (e.g., in the form of digital, RF, or other suitable signals) to cable subscribers, such as cable modems 16. In various embodiments, CMTS 14 comprises a Universal Broadband Router (uBR) with features that enable it to communicate with a Hybrid Fiber Coaxial (HFC) cable network via a suitable cable modem card, which provides an interface between the uBR protocol control information (PCI) bus and radio frequency (RF) signals on the DOCSIS HFC cable network.

In some embodiments, CMTS 14 may comprise a converged cable access platform (CCAP) core that transmits and receives digital signals in IP protocols, coupled with one or more physical interface (PHY) transceiver(s), such as transceiver 18 that convert the digital IP signals into RF signals, and vice versa. The PHY transceivers, such as transceiver 18, may be co-located with the CCAP core at a common location, or may be located remote from the CCAP core and connected over a converged interconnect network (CIN). In some embodiments, CMTS 14 may comprise a single CCAP core and a plurality of PHY transceivers, such as transceiver 18. CMTS 14 is connected (e.g., communicatively coupled, for example, through wired or wireless communication channels) to cable modems 16, transceiver 18, and amplifier 20 in cable network 12.

In some embodiments, intelligent MAC scheduler 26 may comprise a hardware device or software application or combination thereof executing within CMTS 14 to facilitate spectrum sharing by cable modems 16. In other embodiments, intelligent MAC scheduler 26 may comprise a hardware device or software application executing outside CMTS 14, for example, in a separate appliance (e.g., fiber coaxial unit (FCU) access node, etc.), server, or other network element and coupled to (e.g., connected to, in communication with, etc.) CMTS 14 in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter (CMC) that supports RF functions at the PHY layer. Transceivers 18 may comprise pluggable modules (e.g., small form-factor pluggable (SFP)) that may be plugged into a network element chassis, or embedded modules that attach to cables directly. In addition to optical and electrical interfaces, transceivers 18 include a PHY chip, appropriate digital signal processors (DSPs) and application specific integrated circuits (ASICs) according to particular needs. In various embodiments, the DSPs in transceivers 18 may be adapted (e.g., programmed) to perform appropriate interference cancellation as described herein to enable full duplex communication.

Amplifiers 20 comprise RF amplifiers suitable for use in cable network 12. Amplifiers 20 are typically used at intervals in network 12 to overcome cable attenuation and passive losses of electrical signals caused by various factors (e.g., splitting or tapping the coaxial cable). Amplifiers 20 may include trunk amplifiers, distribution amplifiers, line extenders, house amplifier and any other suitable type of amplifier used in cable networks. According to various embodiments, substantially all amplifiers 20 are configured suitably as described herein to facilitate full duplex communication.

Figure 2:
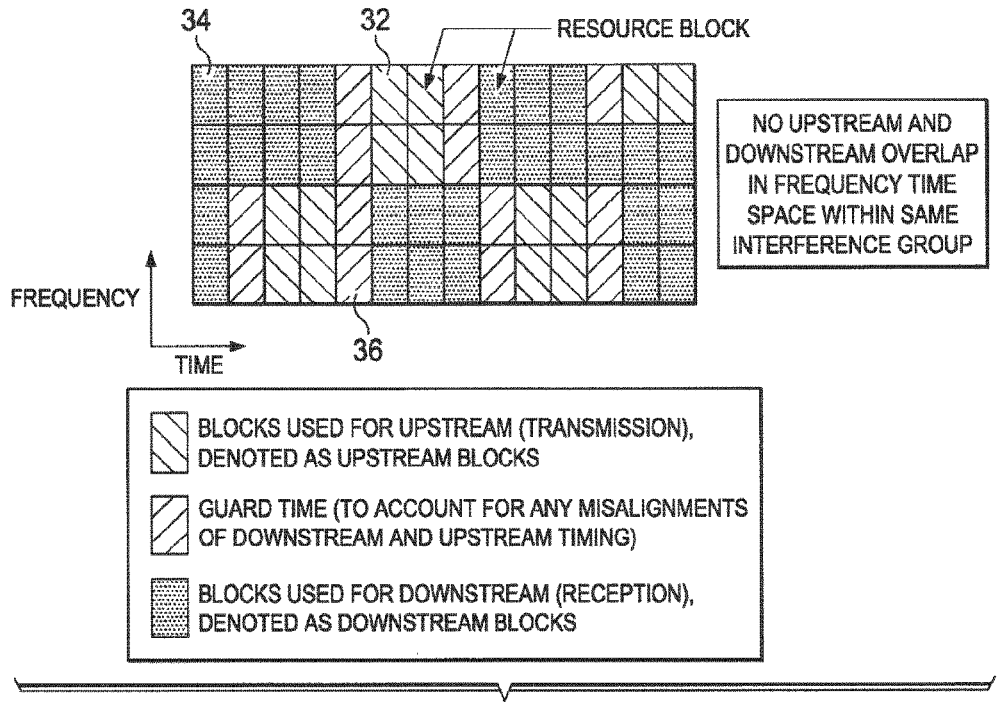
FIG. 2 is a simplified block diagram illustrating other example details of embodiments of the communication system.

Turning to FIG. 2, FIG. 2 is a simplified diagram illustrating example details of frequency planning by MAC scheduler 26 according to an example embodiment of communication system 10. Various frequency ranges used by cable modems 16 in any one of interference groups 30 may be divided in time into resource blocks, such as upstream resource blocks 32, downstream resource blocks 34 and guard time resource blocks 36. In a general sense, the time and frequency employed to transmit an amount of data may be grouped as a resource block. In some embodiments, each resource block may comprise 8 or 16 symbols in time, and 1 subcarrier in frequency. The frequency division aligns with channel boundaries in some embodiments. In other embodiments, the frequency division has finer granularities, such as corresponding to groups of subcarriers for DOCSIS 3.1. The time division aligns with frame boundaries in some embodiments. In other embodiments, the time division aligns with mini-slots boundaries. In various embodiments, upstream resource blocks 32 and downstream resource blocks 34 in the relevant interference group do not synchronize on the time division boundaries; there is no overlap between upstream transmission and downstream receptions in frequency-time space within the same interference group.

In some embodiments, a centric scheduler algorithm may be used to achieve T-R coordination with the described resource allocation scheme. Other embodiments use a distributed scheduler algorithm for T-R coordination. With the centric scheduler algorithm, the resource scheduling in time and frequency is done centrally, for example, with MAC scheduler 26 in CMTS 14. In the distributed scheduler algorithm, the upstream scheduling is done mainly by cable modems 16 through a contention scheme. CMTS 14 assists the upstream scheduling by policing resource usage by cable modems 16 to avoid the collision. In other words, it is a contention based upstream scheduling with collision avoidance. The distributed scheduler algorithm is similar in some ways to the centric scheduler algorithm, in that the distributed algorithm divides the available bandwidth into resource blocks, and follows the rule of no overlapping of downstream resource blocks 34 and upstream resource blocks 32 within any one of interference groups 30.

A simplex bi-directional signaling channel is established between CMTS 14 and cable modems 16 to exchange scheduling information. CMTS 14 broadcasts the downstream resource block allocation information comprising a downstream media access protocol (MAP) message to cable modems 16 in the signaling channel ahead of the actual allocation time. Cable modems 16 listen to the downstream MAP in the signaling channel. Based on the downstream MAP, cable modems 16 sort out upstream resource blocks 32 available for upstream transmission. In various embodiments, a specific downstream MAP message may be applicable to (e.g., correspond with) a particular one of interference groups 30. Based on queue depth (e.g., amount of data queued to be transmitted), cable modems 16 reserve upstream resource blocks 32 by sending a reservation notice to CMTS 14. CMTS 14 echoes the cable modems' reservations in a downstream signaling channel with time stamps. Each of cable modems 16 receives an echo of its own reservation and reservation of other cable modems 16, with time stamps. The specific one of cable modems 16 with the earliest time stamp for its reservation may seize upstream resource blocks 32 and start transmitting.

The downstream and upstream scheduling are not independent of each other. For a specific one of cable modems 16, MAC scheduler 26 may schedule its upstream transmission in certain upstream resource blocks 32; further, MAC scheduler 26 may ensure that other cable modems 16 from the same interference group receive their downstream receptions in downstream resource blocks 34 that do not overlap with scheduled upstream resource blocks 32 of the specific one of cable modems 16. Likewise, for the specific one of cable modems 16, MAC scheduler 26 may schedule its downstream reception in certain downstream resource blocks 34; further, MAC scheduler 26 may ensure that other cable modems 16 from the same interference group transmit upstream in upstream resource blocks 32 that do not overlap with the scheduled downstream resource blocks 34. Multicast and broadcast messages may be scheduled on specific resource blocks without upstream transmission from any cable modems 16. In the case of broadcast video, a block of downstream spectrum (e.g., frequency range) may be allocated for broadcast video, and the corresponding upstream spectrum may be idled to avoid interference to video at cable modems 16.

Figure 3:
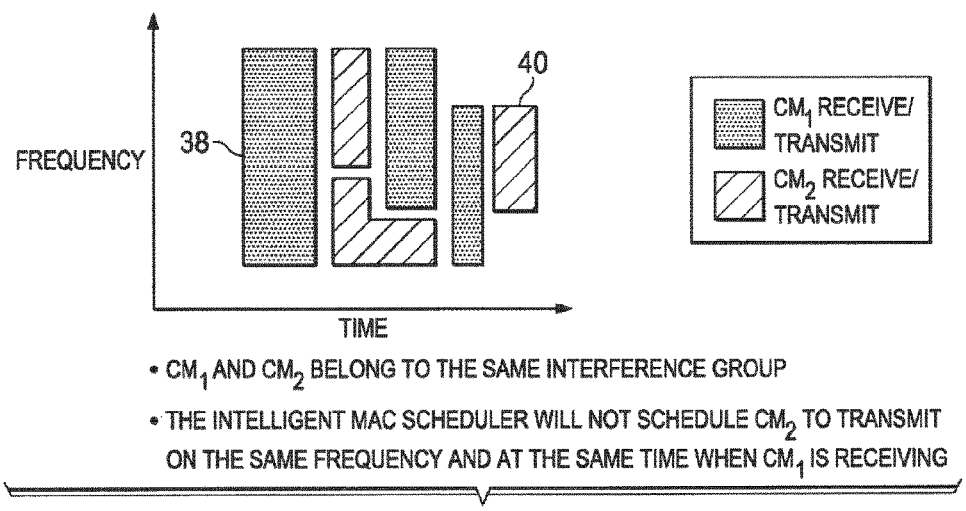
FIG. 3 is a simplified block diagram illustrating yet other example details of embodiments of the communication system.

Turning to 4, FIG. 3 is a simplified diagram illustrating example details of T-R coordination according to an embodiment of communication system 10. Consider T-R coordination among two CMs, $CM_1$ and $CM_2$ in a particular one of interference groups 30 in cable network 12. MAC scheduler 26 may allocate resource blocks 38 to $CM_1$ and resource blocks 40 to $CM_2$. Note that for ease of illustration, upstream resource blocks and downstream resource blocks comprised in resource blocks 38 and 40 are not explicitly shown. MAC scheduler 26 will not schedule $CM_2$ to transmit upstream on the same frequency at the same time when $CM_1$ is receiving downstream. In other words, $CM_1$ and $CM_2$ do not have overlapping resource blocks for upstream transmission or downstream reception. Such pairwise relationship holds for any pair of cable modems 16 in any one of interference groups 30.

Figure 4:
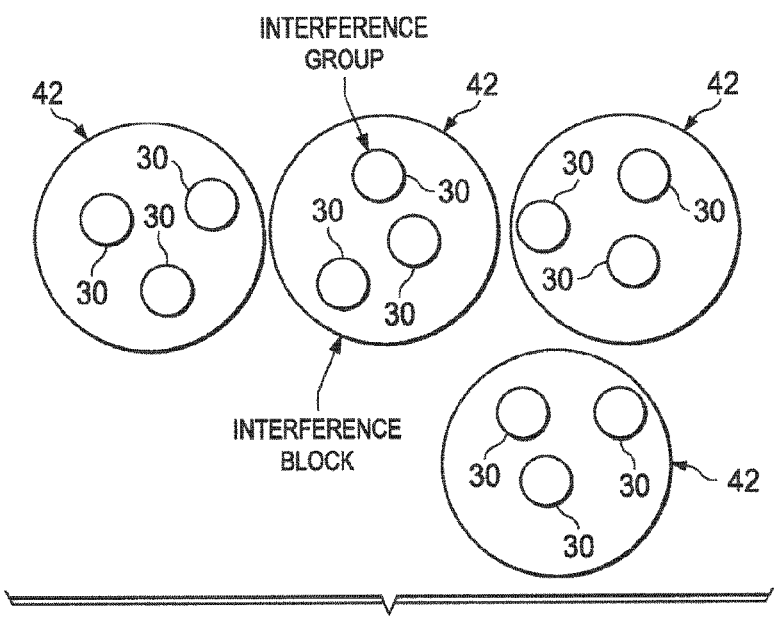
FIG. 4 is a simplified block diagram illustrating yet other example details of embodiments of the communication system.

Turning to FIG. 4, FIG. 4 is a simplified block diagram illustrating example details of an embodiment of communication system 10. In some embodiments, MAC scheduler 26 may operate centrally in cable network 12, implementing T-R coordination centrally, for example, at CMTS 14. MAC scheduler 26 categorizes cable modems 16 into interference groups 30, and schedules upstream transmissions and downstream receptions for cable modems 16 in each interference group 30, such that no cable modem of any one interference group transmits upstream in a frequency range simultaneously as another cable modem in the same interference group receives downstream in the frequency range. The scheduling can allow cable modems 16 in different interference groups 30 to transmit upstream and receive downstream simultaneously in the frequency range. MAC scheduler 26 generates scheduling information of the scheduling. The scheduling information may be comprised in appropriate MAC control messages in some embodiments. MAC scheduler 26 transmits the scheduling information to cable modems 16.

In various embodiments, downstream reception time is interleaved in a zig zag pattern such that downstream data spans multiple symbols overlapped with each other. In a general sense, "interleaving" refers to spreading data over some parameter; data spread over time is referred to as time interleaved data; data spread over frequency is referred to as frequency interleaved data. For example, data comprised in one symbol before interleaving is spread across 32 symbols after interleaving. Note that the term "symbol" has the general meaning familiar to persons with ordinary skill in the art and refers to a time interval for communicating bits of data that are modulated onto carriers at certain frequencies according to the modulation scheme used for the communication (e.g., in a single carrier modulation scheme, as higher data rates are used, the duration of one symbol becomes smaller); data is coded into the frequency domain one symbol at a time. In other words, data is carried in communication channels in cable network 12 in units of symbols in the time domain and frequency sub-carriers in the frequency domain.

Prior to interleaving, subsequent symbols containing downstream data are not overlapped; after interleaving, the downstream data spans multiple symbols and is effectively overlapped with itself. In an example, a packet of data that fits into one or two symbols occupies 32 symbols after interleaving. In various embodiments, upstream transmission time is not interleaved. In various embodiments, downstream transmission frequency is interleaved across a downstream symbol spanning a frequency range of an orthogonal frequency division multiplex (OFDM) resource block (e.g., 192 MHz) (and not the entire frequency spectrum available for cable network 12). Upstream transmission frequency is interleaved across an upstream symbol. The upstream symbol is aligned with the downstream symbol.

To facilitate interleaving in the time and frequency domain, interference groups 30 may be further sorted into interference blocks (IBs) 42. Each interference block 42 comprises a plurality of symbols including a symbol for guard time, with interleaving being implemented using interference blocks 42. In some embodiments, cable modems 16 may be sorted into interference groups 30 at initialization using a special IG Discovery process. Interference groups 30 are sorted into interference blocks 42. Note that interference blocks 42 can comprise any suitable (e.g., convenient, appropriate) grouping of interference groups 30. In an example embodiment, interference blocks 42 may be designated by small letters a, b, c, d, for example, to distinguish them from DOCSIS 3.1 profile designations of capital letters A, B, C, D. In an example embodiment, any one interference block 42 may equal 32 symbols (comprising the interleaved symbols) and one additional symbol for guard time, totaling 33 symbols in all. The guard time symbol may not be a dedicated symbol, but may be conveniently chosen based on the data pattern or other parameters as appropriate.

In some embodiments, a number (e.g., 100) of interference groups 30 may be mapped to a relatively much smaller number (e.g., 4) of interference blocks 42. In other embodiments, a number of interference groups 30 (e.g., 100) may be mapped to an equal or similar order of magnitude number of interference blocks 42 (e.g., 100 or 50). In the latter embodiments, each interference block 42 may serve as a guard time in downstream transmissions from CMTS 14 to cable modems 16. The upstream transmissions would ignore 3× interference block times (e.g., first interference block time during which it is supposed to receive downstream data, and two other interference blocks on either side of the first interference block time). With dynamic assignment of interference groups 30 to interference blocks 42, each interference group 30 can get 97% of the spectrum between downstream reception and upstream transmission. In a general sense, delay and timing differences within any one of interference groups 30 can be accommodated with a one symbol guard time, whereas delay and timing differences between CMTS 14 and interference groups 30 may be accommodated with additional guard time.

Figure 5:
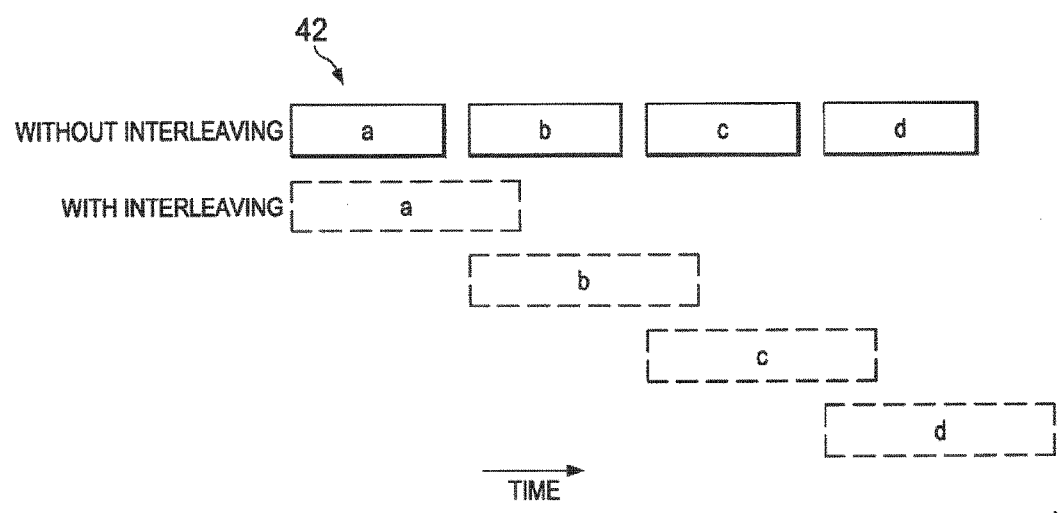
FIG. 5 is a simplified block diagram illustrating yet other example details of embodiments of the communication system.

Turning to FIG. 5, FIG. 5 is a simplified block diagram illustrating example details according to an embodiment of communication system 10. Consider an example transmission comprising four interference blocks 42. In other words, interference groups 30 are categorized into 4 interference blocks 42 (e.g., 100 interference groups map to 4 interference blocks), namely, a, b, c, and d. Without time interleaving, interference blocks a, b, c, d may be stacked one after the other in a repeating pattern. With time interleaving, interference blocks a, b, c, and d may overlap with each other in time according to the extent of interleaving. In some embodiments, time offset may also be implemented, for example, with the next set of interference blocks 42 being some time apart from the previous set of interference blocks 42, for example, to account for time delays and other factors. Such time offset may include guard times to account for delays among cable modems 16, between CMTS 14 and cable modems 16, etc.

Figure 6:
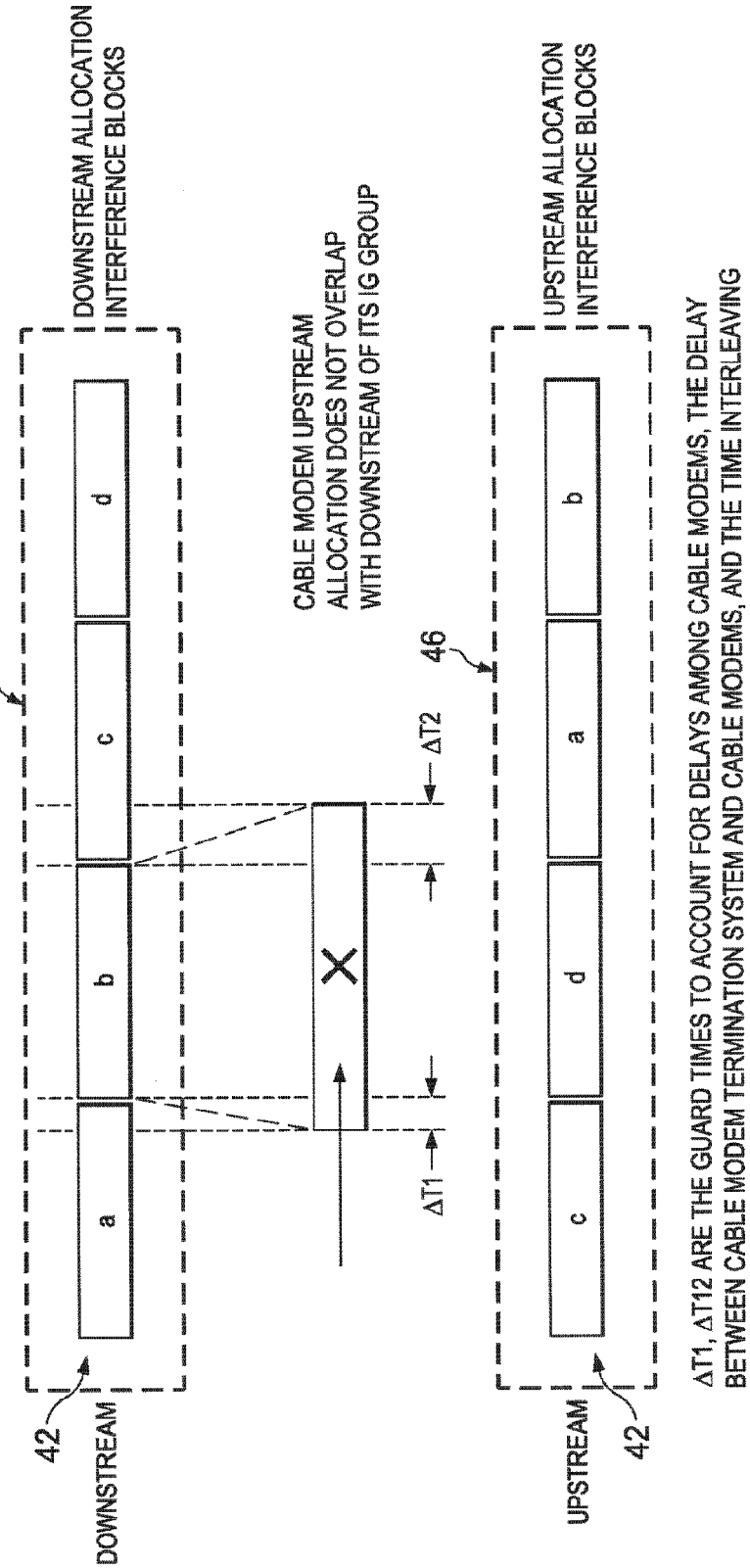
FIG. 6 is a simplified block diagram illustrating yet other example details of embodiments of the communication system.

Turning to FIG. 6, FIG. 6 is a simplified block diagram illustrating example details according to an embodiment of communication system 10. In non-full-duplex cable networks, a cyclic prefix (CP) is different for the downstream symbol and the upstream symbol because they are at different frequencies. However, with full duplex communication, the downstream symbol and upstream symbol can be at the same frequency. In various embodiments, the CP is the same for a particular frequency, regardless of the direction (e.g., upstream or downstream) of transmission, facilitating alignment of downstream and upstream symbols per OFDM resource block. In some embodiments, the time-space alignment of downstream symbols with upstream symbols can be represented figuratively by trapezoids in the downstream lining up with rectangles in the upstream direction. The "bottom" side of the trapezoid would be different in length from the "top" side depending on the amount of time interleaving. In such a figurative representation, the top of the downstream trapezoid would be zero interleaved and can be considered a reference point.

Consider an example transmission comprising four interference blocks 42. In other words, interference groups 30 are categorized into 4 interference blocks 42 (e.g., 100 interference groups map to 4 interference blocks), namely, a, b, c, and d. In such example embodiments, if all interference blocks 42 are of equal bandwidth, then each interference group 30 is only getting 25% of the frequency spectrum.

Each interference block 42 is 33 symbols wide in this example. Assume that interference blocks 42 allocated for downstream transmission are referred to as downstream blocks 44 in pattern a-b-c-d-repeat; interference blocks 42 allocated for upstream transmission are referred to as upstream blocks 46 in pattern c-d-a-b-repeat. Downstream blocks 44 could be lined up with the upstream blocks 46 with an offset of 2 blocks. The gap between blocks a and c is the guard time (comprising blocks b and d). The guard time is at least 32 symbols wide to accommodate downstream frequency interleaving. An extra symbol is included to allow for time differences within an interference group for a total of 33 symbols.

Figure 7:
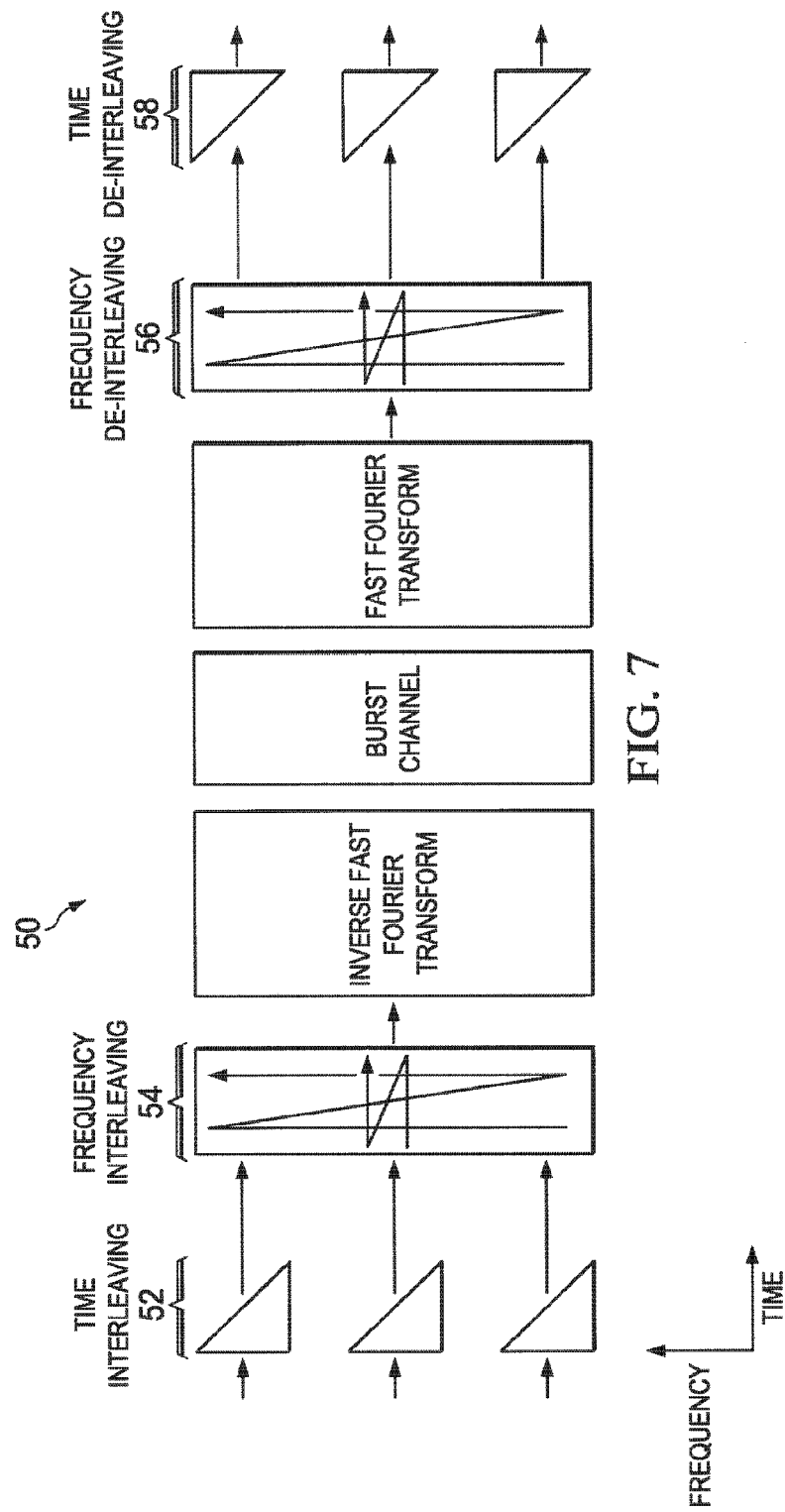
FIG. 7 is a simplified block diagram illustrating yet other example details of embodiments of the communication system.

Turning to FIG. 7, FIG. 7 is a simplified block diagram illustrating example details according to an embodiment of communication system 10. In a general sense, when a time domain interleaving scheme is typically implemented at the symbol level, different carriers of the OFDM symbol are delayed by different amounts. As the carrier allocation is along frequency, the interleaving in time will be effective to mitigate burst interferences; the interferences will be spread across the symbols in time axis, into multiple forward error correction (FEC) blocks. In the case where the burst interference covers many sub-carriers, the interleaving depth is large enough to minimize the numbers of interfered sub-carriers for each FEC block. However, time interleaving introduces delay, which equals the interleaving depth.

According to some embodiments, interleaving 50 takes advantage of the multiple FEC blocks along frequency at each symbol. Time interleaving 52 is performed on the symbols, and frequency interleaving 54 is added to time interleaving 52, for example, to achieve better interleaving efficiency with minimized delay. Accordingly, symbols at each symbol time are re-arranged through a simple storage access scheme without introducing any delay. With addition of frequency interleaving 54 to time interleaving 52, effective interleaving depth is a product of frequency interleaving depth and time interleaving depth. Interleaved data is subjected to Inverse Fast Fourier Transform (IFFT) and sent across a burst channel. At the receiver, the received data is subjected to Fast Fourier Transform (FFT) and frequency de-interleaving 56, followed by time de-interleaving 58.

Figure 8:
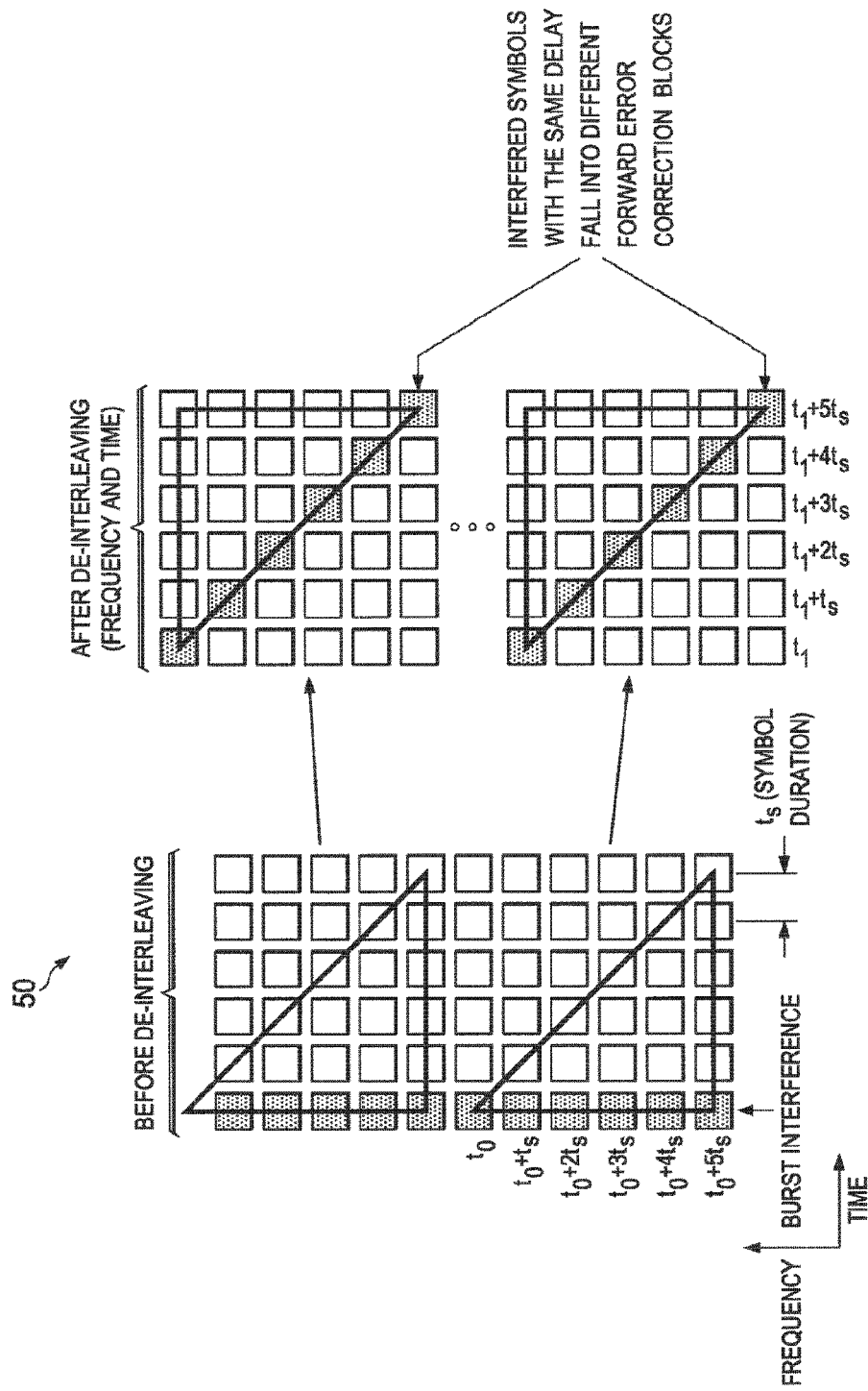
FIG. 8 is a simplified block diagram illustrating yet other example details of embodiments of the communication system.

Turning to FIG. 8, FIG. 8 is a simplified block diagram illustrating example details according to an embodiment of communication system 10. According to the embodiments interleaving 50, in which time interleaving 52 is added to frequency interleaving 54, interferences fall into different FEC blocks after de-interleaving even with shallow interleaving depth along time, leading to enhanced interleaving performance with a minimum delay.

Figure 9:
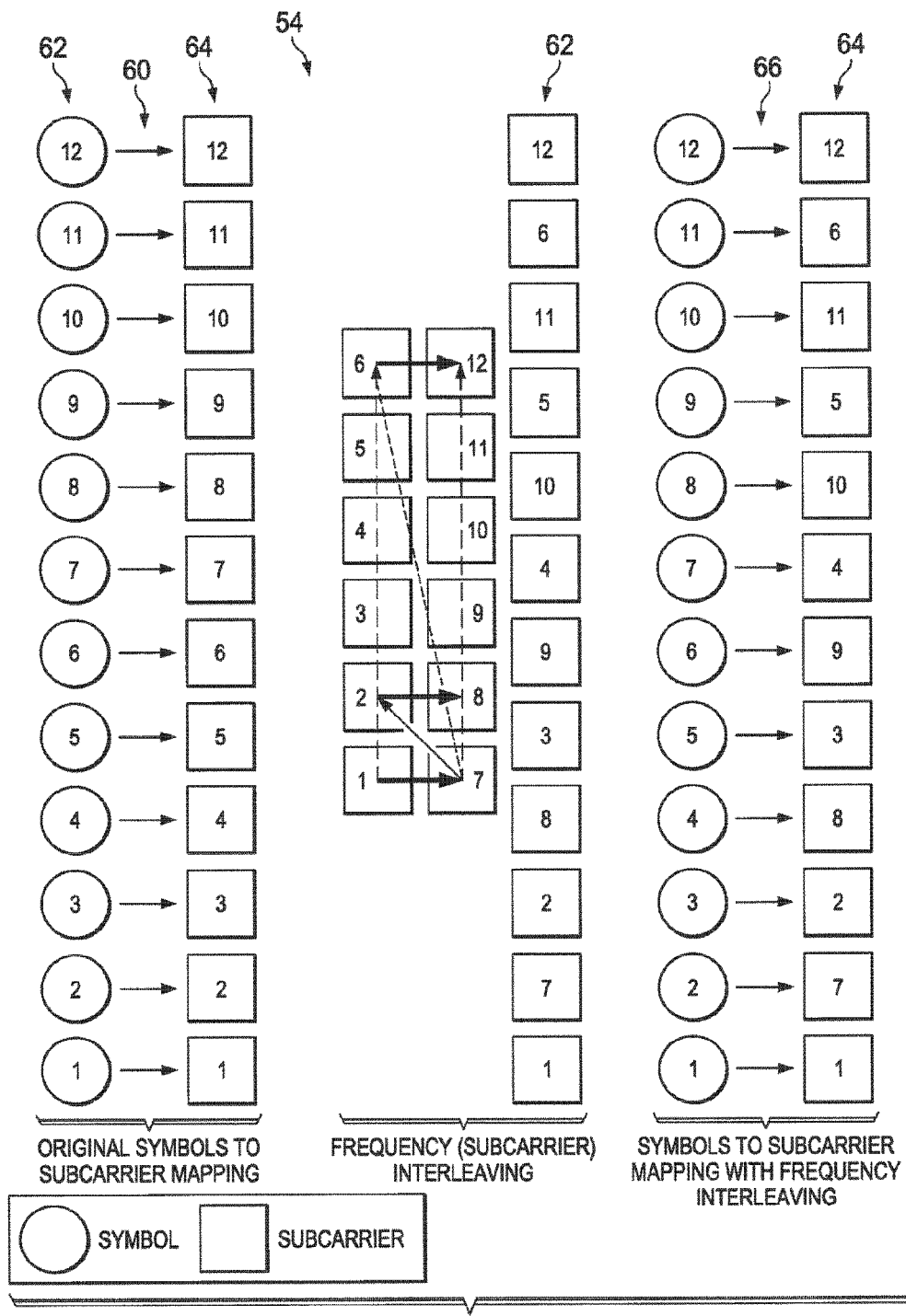
FIG. 9 is a simplified block diagram illustrating yet other example details of embodiments of the communication system.

Turning to FIG. 9, FIG. 9 is a simplified block diagram illustrating example details of frequency interleaving 54 according to an embodiment of communication system 10. Consider a hypothetical example comprising a mapping 60 between symbols 62 and sub-carriers 64. Twelve symbols 62 are mapped to corresponding twelve sub-carriers 64 in mapping 60. According to frequency interleaving 54, sub-carriers 64 are arranged into two columns and are ordered in an ascending order along each of the columns (e.g., 1-6 in column 1 and 7-12 in column 2). Sub-carriers 64 are re-ordered by reading the rows of the two columns in an ascending order (e.g., bottom to top). The final order of sub-carriers 64 after frequency interleaving 54 is no longer in a purely ascending order. Final mapping 66 between symbols 62 and sub-carriers 64 is different from mapping 60 before frequency interleaving 54.

Figure 10:
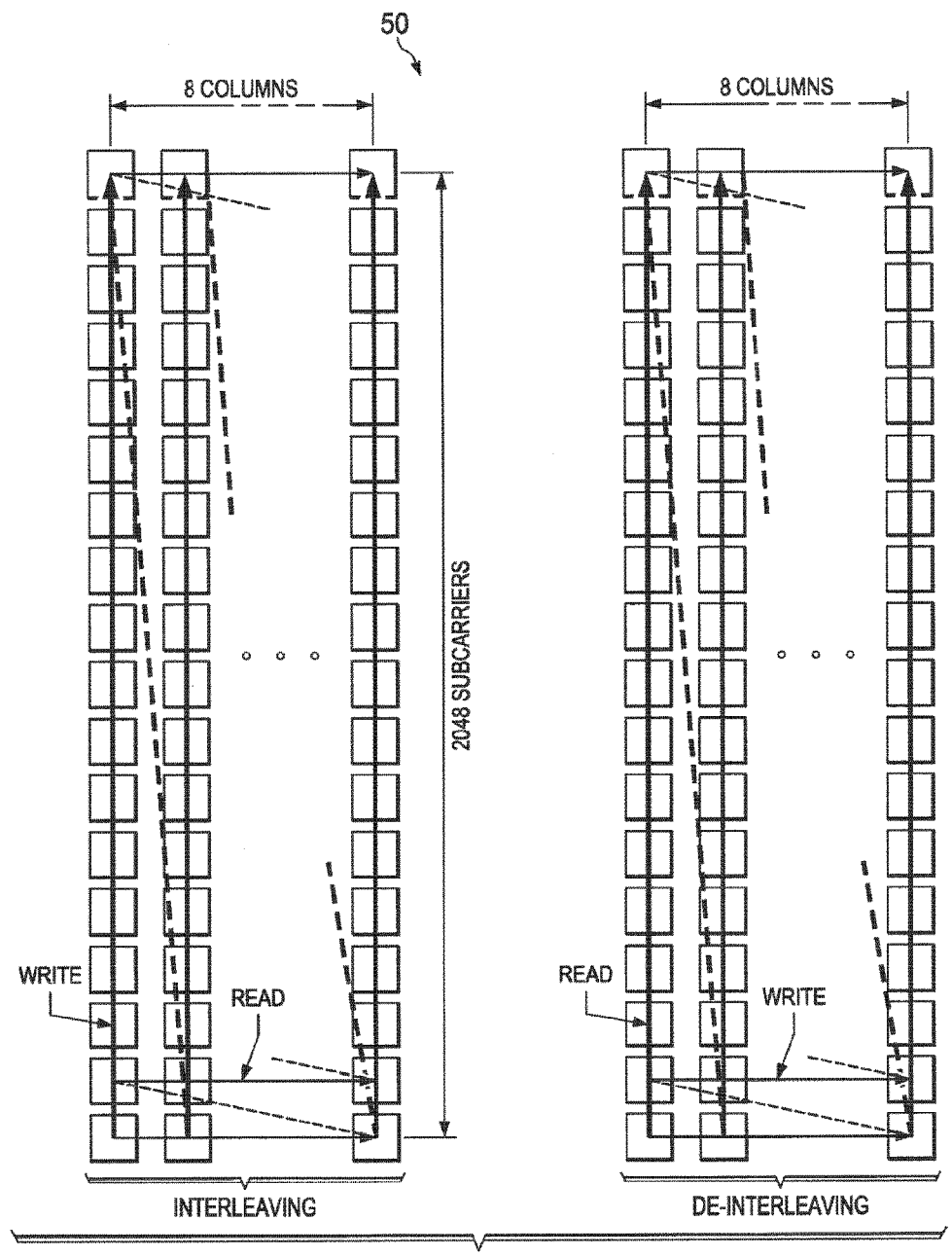
FIG. 10 is a simplified block diagram illustrating yet other example details of embodiments of the communication system.

Turning to FIG. 10, FIG. 10 is a simplified block diagram illustrating example details of interleaving 50 according to an embodiment of communication system 10. To explain further, consider an example with 16384 sub-carriers (192 MHz, 12.5 kHz CS). The 16384 sub-carriers are arranged into 8 columns, each column having 2048 sub-carriers. With 16200 bit-density parity-check (LDPC) and 256-Quadrature amplitude modulation (QAM), each column has one FEC codeword (CW). At the interleaving stage, mapping between symbols and sub-carrier is such a way that the symbols are written along columns, and read out along rows. At the de-interleaving stage, symbols are written along rows, and read out along columns.

Figure 11:
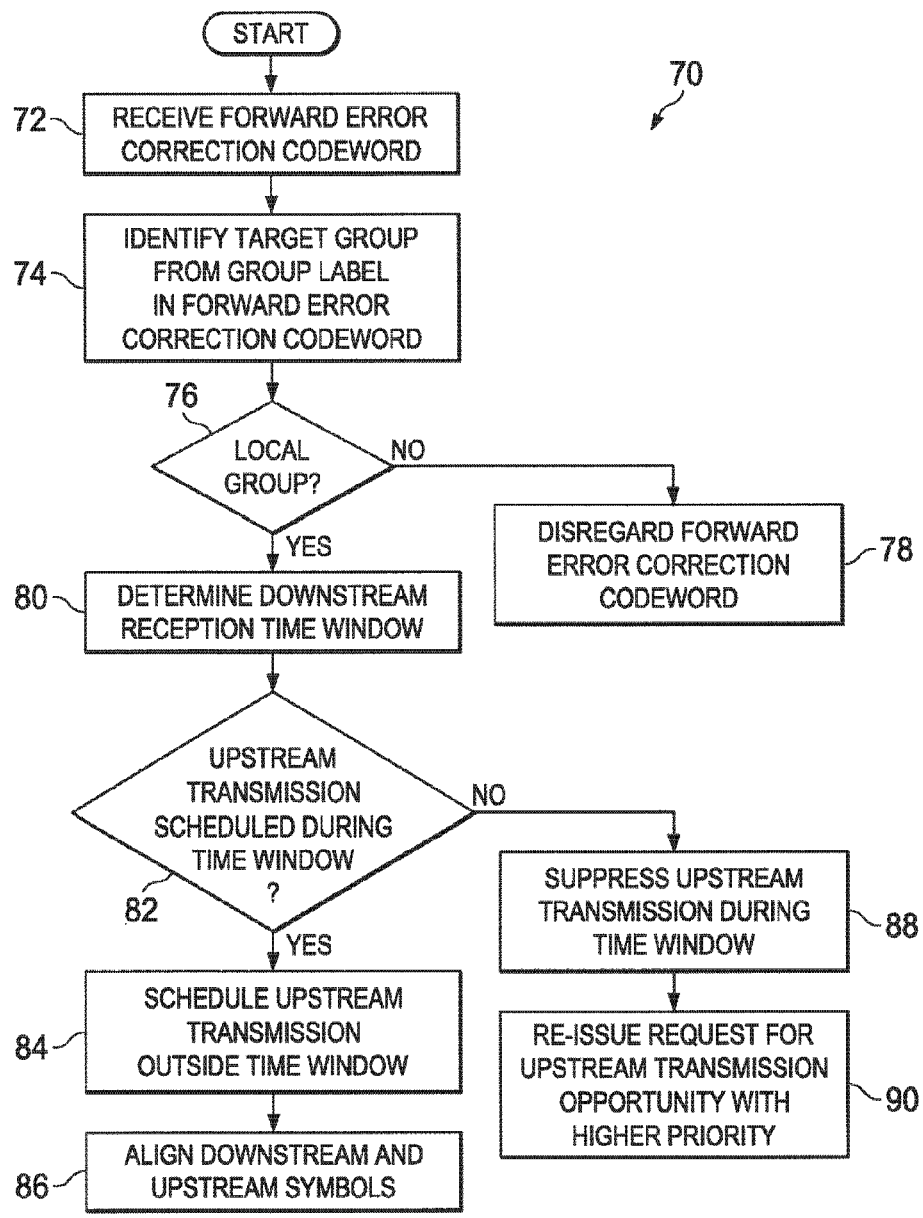
FIG. 11 is a simplified flow diagram illustrating example operations that may be associated with an embodiment of the communication system.

Turning to FIG. 11, FIG. 11 is a simplified flow diagram illustrating example operations 70 according to an embodiment of communication system 10. Operations 70 may be assumed to be executed at a specific one of cable modems 16. In some embodiments, a distributed intelligent scheduling scheme is implemented by MAC scheduler 26 for T-R coordination, for example, to make the scheduling scheme more scalable. The distributed intelligent scheduling is enforced by cable modems 16 and is not centrally enforced at CMTS 14. The distributed scheduling scheme keeps the downstream and upstream scheduling asynchronous with each other.

In general, according to the distributed scheduling scheme, cable modems 16 are divided into a large number of interference groups 30, each having a relatively small number of cable modems 16. Interference groups 30 are established with a IG Discovery process. Downstream transmission in a frequency range from CMTS 14 to cable modems 16 is implemented in one or more transmission units, such as FEC CW. Each FEC CW includes a group label identifying the specific interference group that is receiving data for that FEC CW, distinguishing the downstream transmission in the frequency range to the interference group from downstream transmissions to other interference group. In an example embodiment, the FEC CW group label may be included in a FEC next codeword pointer field (NCP) according to DOCSIS 3.1 standards. At 72, the cable modem executing operations 70 receive the FEC CW. At 74, it identifies the target interference group from the group label in the FEC CW. At 76, a determination is made whether the target interference group is the same as the local interference group to which the cable modem belongs. If the local interference group is not the target interference group, the FEC CW (and subsequent downstream transmission) may be disregarded at 78.

If the local interference group is the target interference group, the cable modem determines the downstream reception time window at 80. The group label in the FEC CW is several CW times in advance or in a separate structure so that the cable modem in the target interference group can anticipate receiving the downstream data ahead of actual reception, and schedule upstream transmission accordingly. At 82, the cable modem makes a determination whether it has scheduled any upstream transmission during the anticipated time window. According to various embodiments, cable modems 16 in the target interference group receiving the FEC CW are not allowed to transmit upstream. Because cable modems 16 request bandwidth ahead of time of upstream transmission, some cable modems 16 may have received a grant during the time window of downstream transmission. (CMTS 14 is not enforcing scheduling restrictions, and freely issues grants.) Thus, the determination at 82 may include identifying any grants available for use during the anticipated time window.

If no upstream transmission is scheduled, at 84, the cable modem schedules upstream transmission outside the anticipated time window (e.g., prior to, or after, the anticipated time window). At 86, the cable modem associates minislots or symbols times in upstream transmissions with minislots or symbols in downstream receptions, aligning upstream and downstream symbols. On the other hand, if upstream transmission is scheduled, at 88, the cable modem suppresses upstream transmission during the anticipated time window, forfeiting the upstream transmission opportunity. At 90, the forfeiture can be managed by re-issuing requests to CMTS 14 with higher priority. In some embodiments, CMTS 14 may poll target cable modems to which it is sending downstream transmissions to check on suppressed transmissions.

In some embodiments, downstream bandwidth per cable modem being limited, downstream bandwidth per interference group can be rate-limited in a hierarchical manner to prevent upstream transmissions from being locked out. Embodiments of communication system 10 may not require any downstream and upstream calibration and alignment at CMTS 14. Long guard times may also be unnecessary, for example, due to large serving area sizes. The reference is local to the cable modems 16 that are close enough to impact each other. In various embodiments, cable modems 16 are "warned" ahead of time of downstream transmission of data and can suppress upstream transmission accordingly.

Each one of interference groups 30 becomes a simplex group in which transmission occurs in one direction at a time. Because the sizes (e.g., memberships) of interference groups 30 are small and there are many of them, the overall effect in cable network 12 is full duplex communication. In various embodiments, any one cable modem has an aggregate bandwidth equal to one copy of the full spectrum. The overall interference group on a node has an aggregate bandwidth equal to two times the spectrum.

In some embodiments that include the distributed intelligent scheduling, a first interference group predicts that a particular frequency range is not going to be used for upstream transmission by a second interference group and hijacks the frequency range for its own upstream transmission. Prediction may be based upon traffic to one or more cable modems in the second interference group, priorities of traffic or devices, back-up list information from CMTS 14, set of contention REQ slots, or other suitable parameters.

Figure 12:
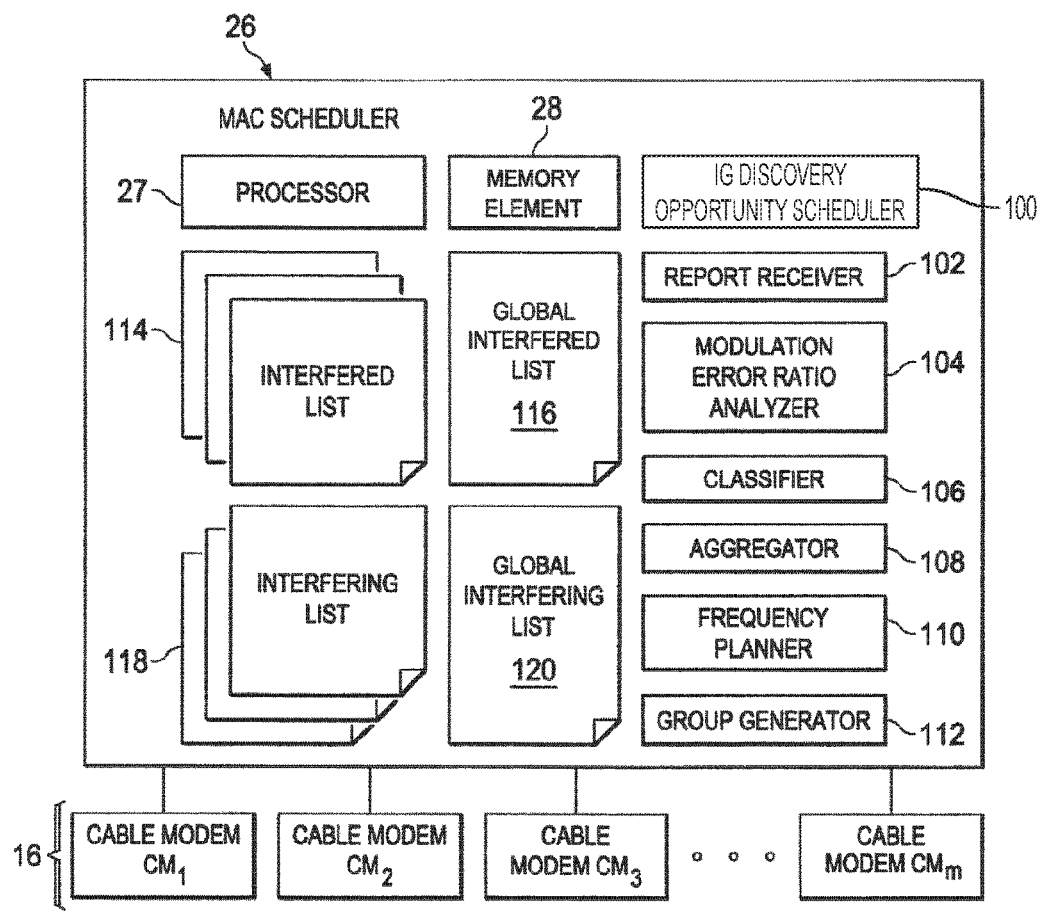
FIG. 12 is a simplified block diagram illustrating yet other example details of embodiments of the communication system.

Turning to FIG. 12, FIG. 12 is a simplified block diagram showing example details of MAC scheduler 26 according to embodiments of communication system 10. MAC scheduler 26 includes a IG discovery opportunity scheduler 100, a report receiver 102, a MER analyzer 104, a classifier 106, an aggregator 108, a frequency planner 110, and a group generator 112. Memory element 28 may store various data, including one or more interfered list 114, a global interfered list 116, one or more interfering list 118, and a global interfering list 120.

During frequency planning and grouping, MAC scheduler 26 may generate, for a particular one of cable modems 16 (say $CM_1$) in cable network 12, interfered list 114 associated with a frequency range. Interfered list 114 comprises a first list of cable modems 16 whose downstream reception in the frequency range is interfered by upstream transmissions of cable modem $CM_1$ in the frequency range. Assume, merely for example purposes, that the first list of cable modems comprises cable modems $CM_2$ and $CM_3$. In other words, interfered list 114 for $CM_1$ comprises $CM_2$ and $CM_3$. MAC scheduler 26 may repeat the interfered list generating process for other cable modems 16 (e.g., $CM_1$ ... $CM_m$) in cable network 12. For example, interfered list 114 for $CM_2$ may comprise $CM_2$ and $CM_m$; interfered list 114 for $CM_3$ may comprise $CM_1$ ... $CM_m$; etc.

The interfered list generating process is repeated for other frequency ranges in the frequency spectrum used in cable network 12. For example, the frequency spectrum may be divided into n frequency ranges (e.g., F(1) to F(n)), and the interfered list generating process may be repeated for each one of the n frequency ranges, with separate interfered lists 114 being generated for each frequency range and each cable modem in cable network 12. Aggregator 108 may aggregate the generated interfered lists into global interfered list 116.

MAC scheduler 26 may further generate, for one of cable modems 16, say $CM_1$, interfering list 118 associated with the frequency range. Interfering list 118 comprises a second list of cable modems whose upstream transmissions in the frequency range interfere with downstream reception of cable modem $CM_1$ in the frequency range. Assume, merely for example purposes, that the second list of cable modems comprises cable modems $CM_2$ ... $CM_m$. In other words, interfering list 118 for $CM_1$ comprises $CM_2$, $CM_3$, ... $CM_m$. MAC scheduler 26 may repeat the interfering list generating process for other cable modems 16 (e.g., $CM_1$ ... $CM_m$) in cable network 12. For example, interfering list 118 for $CM_2$ may comprise $CM_1$ and $CM_3$; interfering list 118 for $CM_3$ may comprise $CM_2$; etc. The interfering list generating process is repeated for other frequency ranges F(1)-F(n) in the frequency spectrum used in cable network 12. Aggregator 108 may aggregate the generated interfering lists into global interfering list 120.

In various embodiments, to generate interfered list 114 for cable modem $CM_1$ for a particular frequency range, say F(1), IG Discovery opportunity scheduler 100 schedules cable modem $CM_1$ to transmit an interference test signal within the frequency range F(1) during a designated IG Discovery opportunity. Report receiver 102 receives reports indicative of interferences on respective downstream reception at the frequency from other cable modems $CM_2$ ... $CM_m$, in cable network 12. The reports include MER values. MER analyzer 104 analyzes the received reports and identifies cable modems $CM_2$ and $CM_3$ that are interfered by the transmitting cable modem $CM_1$ based on the reports. The identification may be based on the value of MER exceeding a predetermined threshold (either absolute or relative). For example, $CM_2$ and $CM_3$ may have reported the highest MER values among cable modems $CM_2$ ... $CM_m$. Classifier 106 adds the identified cable modems $CM_2$ and $CM_3$ to the first list and into interfered list 114 for the cable modem $CM_1$.

In various embodiments, generating interfering list 118 for the cable modem $CM_1$ (and other cable modems 16) comprises deriving the second list of cable modems from global interfered list 116. For example, for cable modem $CM_1$ and each frequency range, from global interfered list 116, classifier 106 looks up the cable modems that interfere with the cable modem $CM_1$ on that frequency range. The interfering cable modems are entered as entries for the cable modem $CM_1$ on that frequency range in corresponding interfering list 118. In various embodiments, interfering list 118 and interfered list 114 are not updated often; they may be updated when changes are made to cable network 12, for example, additional cable modems are added, or existing cable modems are removed.

Frequency planner 110 assigns respective downstream reception frequency ranges and upstream transmission frequency ranges for cable modems 16 ($CM_1$ ... $CM_m$) based on global interfered list 116 and global interfering list 120. For example, $CM_1$ may be assigned downstream reception frequency range F(1) and upstream transmission frequency range F(3); $CM_2$ may be assigned downstream reception frequency range F(3) and upstream transmission frequency range F(n); and so on. In various embodiments, the assigning is on a first-come-first serve basis. For example, downstream reception frequency range may be selected from among the frequency ranges and assigned to the first available (e.g., recognized, identified, listed, sorted, etc.) unassigned cable modem to the exclusion of other cable modems based on global interfered list 116 and global interfering list 120.

The assigning may be based on un-aggregated lists alternatively in some embodiments. Note that the aggregation operation is merely for convenience and may be skipped without departing from the scope of the embodiments. MAC scheduler 26 transmits to cable modems 16 ($CM_1$ ... $CM_m$) corresponding assignment information comprising the respective assigned downstream reception frequency ranges and upstream transmission frequency ranges.

In some embodiments, group generator 112 groups cable modems 16 into interference groups 30, each interference group being isolated on frequency basis from other interference groups, with cable modems in each group being assigned a common downstream reception frequency range and a common upstream transmission frequency range. For example, cable modems $CM_1$, $CM_2$ and $CM_3$ may be assigned to group A. Cable modems $CM_1$, $CM_2$ and $CM_3$ may be assigned a common downstream reception frequency range of F(1) and a common upstream transmission frequency range of F(2). In some embodiments, the grouping is based on interfered list 114. For example, the cable modem $CM_1$ is grouped with the first list of cable modems comprising the cable modems $CM_2$ and $CM_3$ into interference group A for the frequency range F(1). In other words, when grouping is based on interfered list 114, downstream receptions of cable modems in each interference group for the corresponding frequency range are interfered by upstream transmissions of the cable modem in the corresponding frequency range.

In some embodiments, grouping may take advantage of the natural network architecture. For example, the cable modem $CM_1$ is grouped into interference group A with other cable modems $CM_3$ and $CM_m$ connected to a commonly coupled amplifier in cable network 12. In some embodiments, interference groups are further divided into a plurality of sub-groups with relative isolation among the sub-groups, for example, in which each sub-group comprises cable modems attached to a corresponding common tap (which is further down the network towards the cable modems than the common amplifier of the interference group). In various embodiments, cable modems in the interference group transmit upstream at a first frequency and receive downstream at a different frequency within the frequency range. For example, the cable modem $CM_1$ transmits upstream at frequency $F_1$ and receives downstream at frequency $F_2$ within frequency range F(n).

Figure 13:
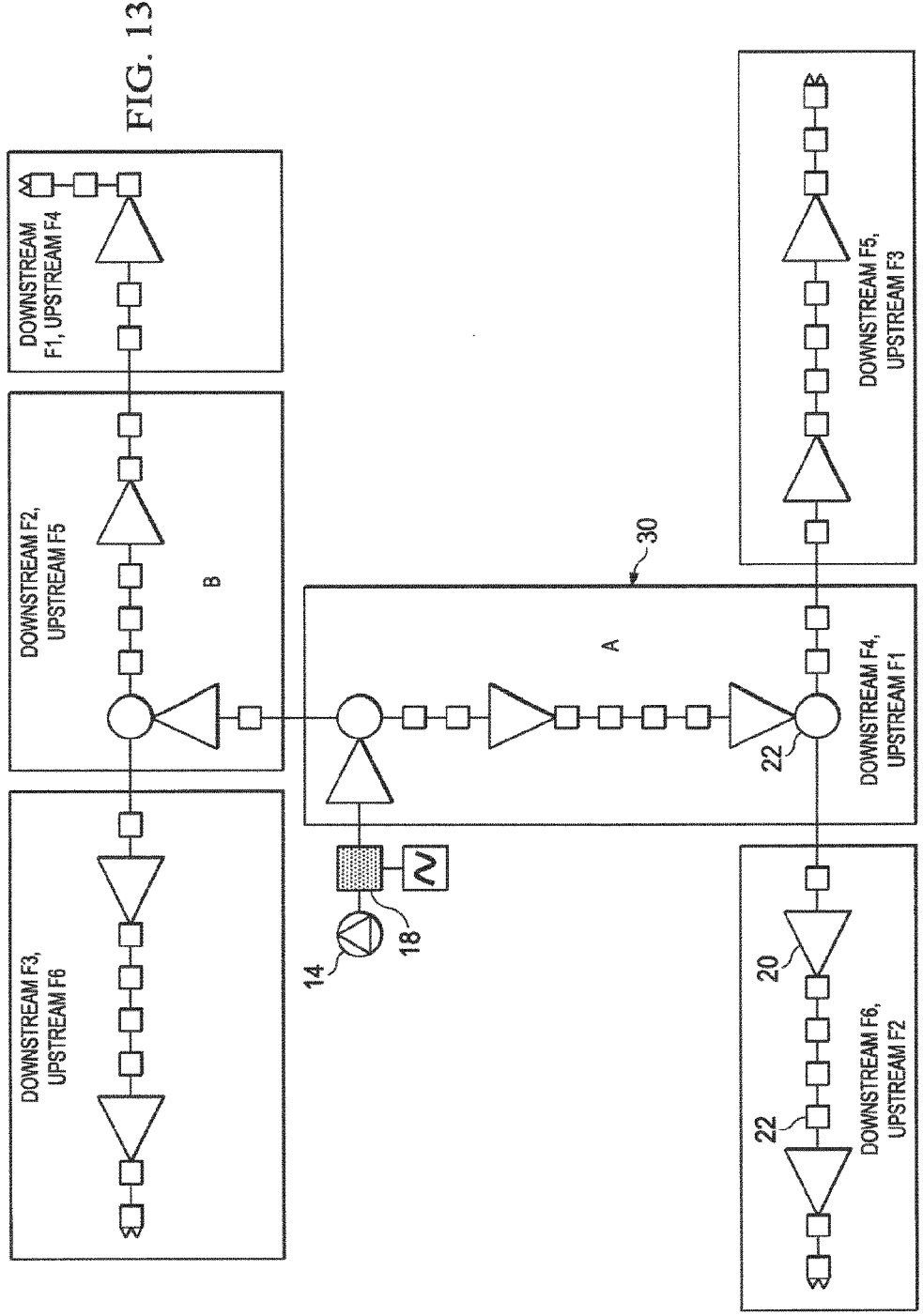
FIG. 13 is a simplified block diagram illustrating yet other example details of embodiments of the communication system.

Turning to FIG. 13, FIG. 13 is a simplified block diagram showing example details of CM grouping according to an embodiment of communication system 10. In various embodiments, cable modems 16 may be grouped into various interference groups 30 to enable full duplex communication with little to no interference. For the sake of simplicity and ease of illustration, cable modems 16 are not shown explicitly in the figure, but are merely represented by one (or more) taps and splitters 22. It may be appreciated that each tap/splitter 22 may be connected to one (or more) cable modems 16. Interference groups 30 may comprise RF isolated groups that allow frequency re-use through intelligent MAC scheduling.

Interference groups 30 provide a basis for T-R coordination in various embodiments. In a general sense, the purpose of T-R coordination is to avoid interference among cable modems 16. T-R coordination is a 2-dimensional resource allocation scheme that ensures that no CMs from the same interference group transmit simultaneously on a frequency that is being used by other CMs to receive data, and vice versa. The two dimensions comprise frequency and time.

In various embodiments, for a specific CM, its interference group is considered to be a group of CMs whose downstream receptions are interfered by the specific CM's upstream transmission. Interference groups could be frequency dependent. For example, in interference group A, cable modems 16 transmit upstream at frequency F1, and receive downstream at frequency F4, which is different from F1; in interference group B, cable modems 16 transmit upstream at frequency F5, and receive downstream at frequency F2; and so on. Cable modems 16 may belong to multiple interference groups, one for each frequency (e.g., carrier). In some embodiments, the interference may not be symmetric: a specific CM may interfere with another CM, but not the other way around. In other embodiments, the interference may be symmetric, with two CMs interfering with each other. For simplicity, relevant cable modems 16 (either interfere with or are interfered by, on any frequency) could be grouped into a single interference group. Cable modems 16 within each group tend to interfere with each other, but there are no or little interferences among cable modems 16 in different groups.

CMs that are within the same interference group may interfere with each other. That is, the upstream signal may not be sufficiently attenuated to be subtracted out of the combined spectrum. In some embodiments, the interference group may comprise CMs within the same tap group. Since there is no way of exactly knowing which CM is on which tap group, this has to be measured and the resulting groupings may not align exactly with a particular (e.g., single) tap group.

In an example embodiment, the frequency spectrum of cable network 12 may be divided into multiple frequency ranges. In some embodiments, each frequency range aligns with a channel boundary. For each specific one of cable modems 16 and each frequency range, MAC scheduler 26 may identify those cable modems 16 whose upstream transmissions interfere with downstream receptions of that specific one of cable modems 16, and those cable modems 16 whose downstream receptions are interfered by upstream transmissions of that specific one of cable modems 16, if they operate on that same frequency. Based on such identification, MAC scheduler 26 avoids assigning cable modems 16 to frequency ranges that may cause interferences among them. Cable modems 16 operate with FDD and no neighboring cable modems 16 are assigned to overlapping downstream and upstream frequency ranges.

Figure 14:
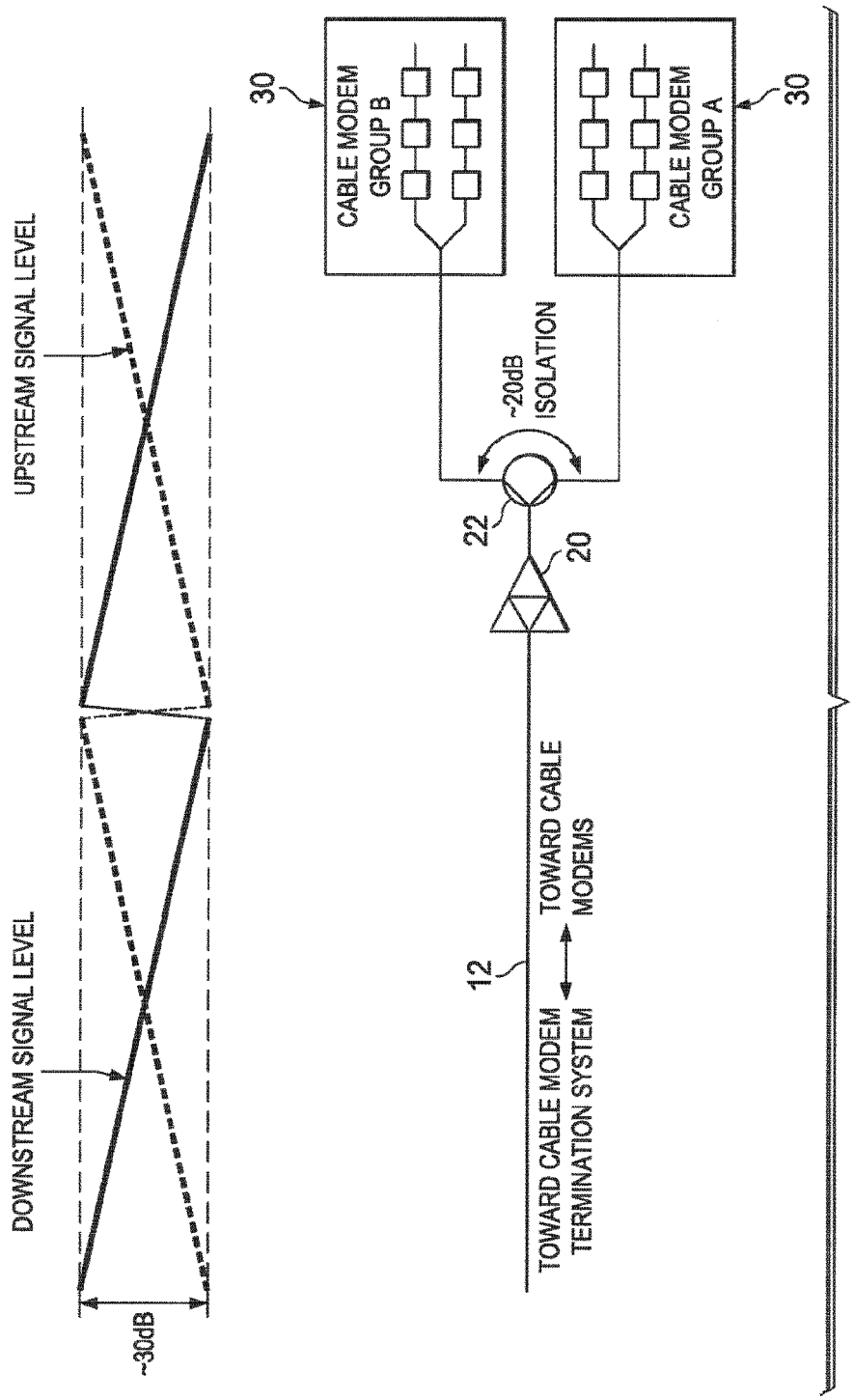
FIG. 14 is a simplified block diagram illustrating yet other example details of embodiments of the communication system.

Turning to FIG. 14, FIG. 14 is a simplified block diagram showing further example details of CM grouping according to an embodiment of communication system 10. In some embodiments, frequency planning can leverage isolations resulting from natural CM grouping in cable network 12. Note that cable network topology is largely driven by street and house layout and may vary dramatically from one community to others. The device performances (e.g., coupling, directivities, etc.) that dictate interference among cable modems 16 also vary in a wide range. Typically, distribution cables are branched out at the output of amplifier 20 (e.g., tree architecture). Taps and splitters 22 at amplifier 20 may provide approximately 20 dB isolation among cable modems 16 of each branch (e.g., division), whereas interference between downstream and upstream signals may be approximately 30 dB, permitting CMs in different groups to interfere only minimally, if at all. CMs covered by a single branch may belong to a single group in some embodiments. For example, two groups A and B of CMs that branch off after amplifier 20 may be unlikely to interfere with each other (cable modems 16 in group A will not interfere with cable modems 16 in group B and vice versa).

Figure 15:
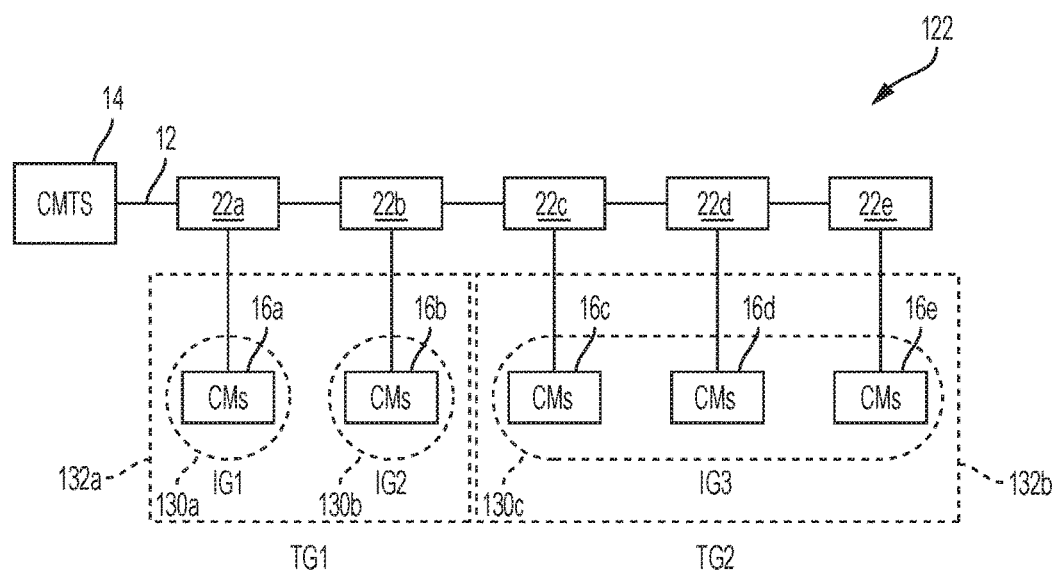
FIG. 15 is a simplified block diagram illustrating another communication system comprising a network architecture for full duplex resource allocation in a cable network environment.

Turning to FIG. 15, FIG. 15 is a simplified block diagram illustrating another communication system comprising a network architecture for full duplex resource allocation in a cable network environment. FIG. 15 illustrates a cable network 122 (indicated generally by an arrow) facilitating full duplex communication between a cable modem termination system (CMTS) 14 and one or more cable modems (CMs) 16a-16e. Network 122 includes taps and splitters 22a-22e. In the particular embodiment illustrated in FIG. 15, a first tap and splitter 22a is coupled to cable network 12 and in communication with a first group of CMs 16a, a second tap and splitter 22b is coupled to cable network 12 and in communication with a second group of CMs 16b, a third tap and splitter 22c is coupled to cable network 12 and in communication with a third group of CMs 16c, a fourth tap and splitter 22d is coupled to cable network 12 and in communication with a fourth group of CMs 16d, and a fifth tap and splitter 22e is coupled to cable network 12 and in communication with a fifth group of CMs 16e.

The full duplex (FDX) operation of cable access networks maximizes spectral utilization by enabling simultaneous downstream (DS) and upstream (US) transmissions among cable modems (CMs) that have sufficient RF isolation in passive coax cable networks. CMs interfering each other, on the other hand, are grouped into an interference groups (IG) for the CMTS to enforce the interference avoidance rule, such that within the IG, CMs do not transmit in the upstream and downstream direction over the same spectrum at the same time. In one or more embodiments, an interference group (IG) is a tap group that may contain one or more cable modems (CMs). An IG may also contain CMs from more than one tap groups, if the taps, for example, have poor port to port isolation. Multiple IGs may exist in a coax distribution network attached to a fiber node.

From the CMTS and plant point of view, the spectrum is used in true full duplex mode with DS and US signals transmitted on the same spectrum at the same time. From a CM point of view, it is only assigned with a simplex spectrum, with no simultaneous DS and US transmissions using the same spectrum. Since HFC runs in a hybrid mode, the interference resulting from the full duplex operation will be different from in the CMTS and in the CM. At the CMTS, since the receiver sees the co-channel interference and adjacent channel interference coupled from its own transmitter, an echo cancellation technique can be applied to subtract the interference from the received signal. While at the CM, in addition to the adjacent channel interference from its own transmitter, the receiver also sees the co-channel interference from neighboring CM transmitters due to poor RF isolation. Since an echo canceller cannot remove the interference from neighboring CMs, a MAC layer interference avoidance scheme is used to extend the simplex spectrum assignment to the neighboring CMs, or the interference group (IG), where one CM's US transmission interferences with other CMs' DS signal reception.

IGs are based on actual measured interference between neighboring CMs. If there is good isolation between taps, there may be quite a few independent IGs within a network. For scheduling convenience, it may be desirable to minimize the number of groups to be scheduled. This is achieved by assigning IGs into transmission groups (TGs). In particular embodiments, IGs may be assigned to TGs based on such factors as traffic density, multicast groups, or any number of predetermined criteria determined by CMTS 14. So, whereas IG are groups based upon a physical property, TGs are based upon a logical need. For example, for an 80 households passed per (HPP) node, there may be 20 taps. If each tap is determined to be a separate IG, then there would be 20 IGs within the network. For scheduling purposes, the scheduler may only required two TGs. Accordingly, the 20 IGs are grouped into two TGs.

In general CMTS 14 is not aware of the physical topology of communication network 122 in terms, for example, of which particular tap and splitter a CM is connected to, how long a cable is between each tap and splitter, and how long a cable is between a particular tap and splitter and a CM. In order to determine interference levels between CMs, a interference group (IG) discovery procedure is performed in order to group CMs 16a-16e to enable full duplex communication with little or no interference. IG discovery is required before a CM can operate in the FDX mode in order for the CMTS to enforce interference avoidance through spectrum allocations. In the embodiment illustrated in FIG. 15, an IG discovery procedure is performed to determine that three interference groups exist within network 122 in which a first IG (IG1) 130a includes the first group of CMs 16a, and a second IG (IG2) 130b includes the second group of CMs 16b. A third IG (IG3) 130c includes the third group of CMs 16c, the fourth group of CMs 16d, and the fifth group of CMs 16e. In particular embodiments, IGs 130a-130c may comprise radio frequency (RF) isolated groups that allow frequency re-use through intelligent MAC scheduling. In the particular embodiment illustrated in FIG. 15, first IG 130a and second IG 30b are assigned to a first transmission group (TG1) 132a, and third IG 130c is assigned to a second transmission group (TG2) 132b.

As previously discussed, with a full duplex (FDX) DOCSIS system the spectrum resource is divisible in frequency and/or time and can be used as for both downstream (DS) and upstream (US) transmission. This can be achieved by taking advantage of the RF signal isolation among CMs in the passive coax cable networks to cluster CM into different interference groups (IGs). Within an IG, a CM's US transmission affects other CMs' DS reception. Between different IGs, there is sufficient RF isolation to ensure no US-to-DS interference. An interference aware RF resource allocation scheme can thus be applied such that within an IG, the spectrum resource in frequency and time can only be used for either DS or US transmission, but not for both directions at the same time; while such a DS/US spectrum resource can be reused for transmission in the other direction for CMs in a different IG for maximized spectral utilization.

Various embodiments described herein provide for a centralized system and method to implement interference aware RF spectrum resource allocation to FDX cable systems, such as FDX DOCSIS cable systems. One or more embodiments of the interference aware FDX spectrum resource allocation scheme is achieved collectively by the CMTS MAC-PHY components and CMs, with intelligence residing at the CMTS MAC. In particular embodiments, the CMTS MAC-PHY components may be co-located in the same chassis as in an integrated CMTS (I-CMTS) or located separately and connected through a network connection such as Ethernet in CCAP-RPHY systems.

FDX spectrum resources can be partitioned with frequency division duplex (FDD), time division duplex (TDD), or a hybrid time and frequency division duplex (TaFD). In FDD, the spectrum resource is organized into frequency bands/channels. In a particular example of an FDD channelization plan with a full FDX spectrum from 108 MHz to 1218 MHz, there are 6 OFDM DS channels and 12 OFDMA upstream channels having a maximum DS and US channel width at 192 MHz and 96 MHz, respectively. In TDD, the DS and US share a single common frequency band by taking turns transmitting. In particular embodiments, the US is framed with minislots and the DS packets are transmitted as a continuous bitstream without a frame structure. In particular embodiments, a common frame structure is used for TDD with DS and US transmission opportunities aligned at the frame boundary. To achieve this, the DS and US symbols are aligned within a cyclic prefix (CP) window and the frame size is aligned with the US minislot boundary and the DS interleaver depth. TaFD uses both TDD and FDD and allocates resource blocks as defined in a time-frequency grid. For example, a FDD channel can be allocated for services that require a minimum reserved rate and minimum latency, and TDD can be used on another frequency band to dynamically adjust resource allocation between the DS and the US to satisfy best effort services.

At the CMTS MAC layer, the FDX RF spectrum is viewed as a pool of bandwidth resource divisible in frequency and time. A unit of the spectrum resource is referred as a resource block (RB), which may be used for either DS or US transmission if used as simplex spectrum, or for both DS and US transmissions if used as duplex spectrum. For FDD, a RB is mapped to a frequency band that may contain one or more DS/US channels. For TDD, a RB is mapped to a FDX frame, a new timing structure introduced herein. An RB has a configurable bandwidth capacity in bytes for each DS and US direction that defines the granularity for DS/US resource sharing. Multiple RBs may be combined and granted to a DS/US service flow as a single transmission block (TB). To support potentially a large number of IGs in a scalable manner, the transmission group (TG) logical entity is used, which as discussed above may contain one or multiple IGs. Within a TG, a simplex spectrum allocation rule is enforced such that no RB can be included in both DS and US TBs at the same time. In particular embodiments, CM to IG/TG mapping is achieved through an interference detection procedure.

In accordance with one or more embodiments, CMTS 14 includes an FDX scheduler. The CMTS FDX scheduler offers hierarchical bandwidth sharing among contending service flows through the TGs, with objectives to maximize FDX spectrum utilization, avoid interference, as well as providing for DOCSIS QoS guarantees and bandwidth fair sharing. As further described herein, in one or more embodiments, the FDX scheduler is implemented with unidirectional DS and US QoS schedulers and a RB mapper. In existing CMTSs, DS and US schedulers run as completely independent entities. In accordance with various embodiments, for FDX scheduling DS and US QoS schedulers are interconnected at the TG level in order to satisfy a simplex spectrum constraint per TG. In one or more embodiments, this constraint is implemented by determining the combined DS and US bandwidth shares, and proportionally modifying (e.g., reducing) the DS and US shares to ensure the bidirectional traffic load does not exceed the simplex spectrum capacity per TG. In one or more embodiments, a mirroring mechanism is used to communicate the bandwidth requirements from the other direction over the data path, as further described herein.

In one or more embodiments, the RB mapper at the MAC layer is responsible to map the bandwidth allocation in bytes from the QoS scheduler to a set of RBs. In particular embodiments, RBs are selected for a TG based on the RBs' bandwidth capacity and a negation/logical-not rule such that the DS and US traffic from the same TG is mapped to mutually exclusive RBs. In particular embodiments, an optimized packing scheme is used to maximize the bidirectional spectrum utilization. In still other particular embodiments, the RB mapper also performs per RB shaping to align the scheduling rate with the actual RB capacity.

As a result of the RB mapping, a map of TBs is produced that satisfies the traffic demand for both US and DS transmissions. In one or more embodiments, the TB maps are transmitted or otherwise conveyed to the remote PHY devices (RPD)s to instruct the PHY convergence layer's operation. In one or more particular embodiments, changes to the DOCSIS R-PHY signaling for FDX support are provided which includes modifications to existing DOCSIS3.1 R-PHY signaling, and a new message type to convey the DS TB arrangement. In one or more embodiments, the PHY executes RB allocation by converting the DS packets into PHY layer code words and symbols for the intended RB. In particular embodiments, this is performed by a buffering structure change in the PHY convergence layer, and a new framing structure in the PHY sub-layer for TDD support as further described herein.

In one or more embodiments, the FDX CM identifies its TBs by listening to DOCSIS MAC management messages, first to associate itself to a TG, and then to associate the TBs to its assigned TG. In particular embodiments, a DOCSIS signaling change is further described herein which includes modifications to existing DOCSIS3.1 signaling, and a new message type to convey the DS TB arrangement.

Figure 16:
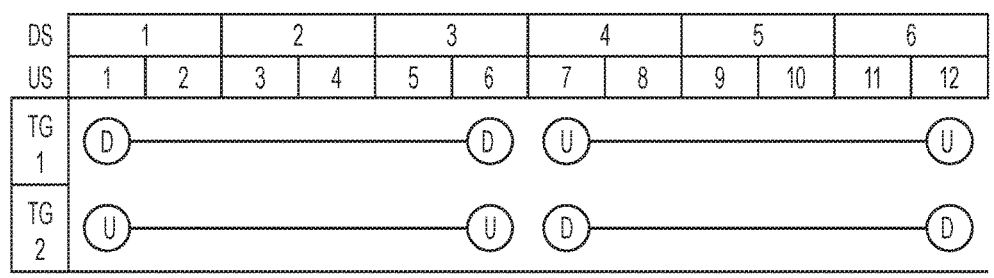
FIG. 16 illustrates an embodiment of single dimensional FDX resource block allocation with two transmission groups.

Turning to FIG. 16, FIG. 16 illustrates an embodiment of single dimensional FDX resource block allocation with two transmission groups. FDD or TDD, if used on its own, is a single dimensional RB allocation scheme. The top row shows 6 DS RBs and 12 US RBs. On the left are two transmission groups (TGs) including first TG (TG1) 132a and second TG (TG2) 132b. The barbell style diagrams illustrate bonding groups in the case of FDD or composite grants in the case of TDD. In the particular example illustrated in FIG. 16, first TG (TG1) 132a is allocated DS RBs 1-3 and US RBs 7-12, and second TG (TG2) 132b is allocated US RBs 1-6 and DS RBs 4-6. In this example, each TG is given 50% of the bandwidth for downstream and 50% of the bandwidth for upstream. Within a TG, different frequencies are used for isolating the downstream and upstream transmissions. However, between TGs it does not matter. Thus, upstream transmissions will not interfere with downstream reception. From the CMTS viewpoint, 100% of the spectrum is used for both downstream and upstream transmission.

Figure 17:
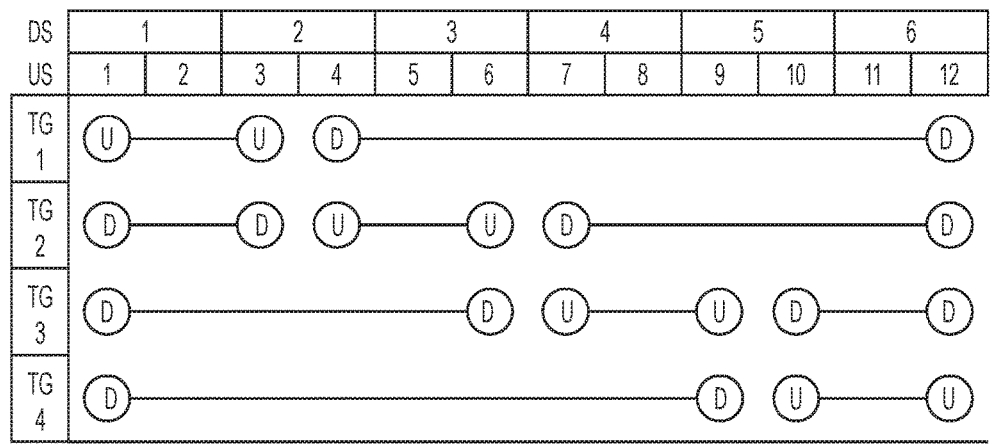
FIG. 17 illustrates an embodiment of single dimensional FDX resource block allocation with four transmission groups.

Turning to FIG. 17, FIG. 17 illustrates an embodiment of single dimensional FDX resource block allocation with four transmission groups. The top row shows 6 DS RBs and 12 US RBs. On the left are four transmission groups (TGs) including first TG (TG1), second TG (TG2), third TG (TG3) and fourth TG (TG4). In the particular example illustrated in FIG. 17, first TG (TG1) is allocated US RBs 1-3 and DS RBs 2-6, and second TG (TG2) is allocated DS RBs 1-2 & 4-6 and US RBs 4-6. Third TG (TG3) is allocated DS RBs 1-3 & 5-6 and US RBs 7-8, and fourth TG (TG4) is allocated DS RBs 1-5 and US RBs 10-12. In this example, an asymmetrical allocation is shown in which the upstream is 25% of the bandwidth and the downstream is 75% of the bandwidth within each TG. From the CMTS viewpoint, 100% of the spectrum is used for both downstream and upstream transmission.

Figure 18:
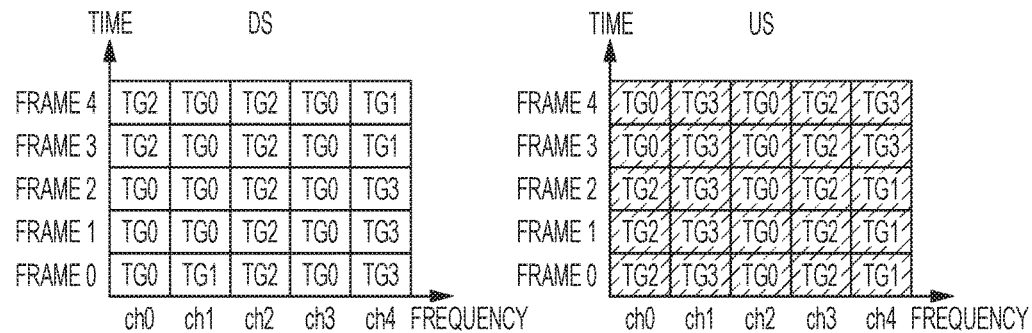
FIG. 18 illustrates an embodiment of two dimensional TaFD FDX resource block allocation with four transmission groups.

Turning to FIG. 18, FIG. 18 illustrates an embodiment of two dimensional TaFD FDX resource block allocation with four transmission groups. In the example illustrated in FIG. 18, FDD is used at DS and US channel pairs (Ch2, Ch3) for TG0 and TG2, providing a minimum reserved rate requirement by both TGs, while TDD is used on DS and US channel pair at Ch0 to allow excess bandwidth sharing. In FIG. 18, the vertical axis shows four frames (frame 0-frame 4) in the time domain, and the horizontal axis shows four channels (Ch0-Ch4) in the frequency domain for both DS and US. As shown in FIG. 18, each of TG0-TG4 is allocated particular combinations of time frames and frequency channels. In the example of FIG. 18, resource allocations for the four TGs (TG0-TG3) showing DS percentage, US percentage and DS to US ratio are as follows:

|      | DS percentage | US percentage | DS to US ratio |
|------|---------------|---------------|----------------|
| TG 0 | 48%           | 28%           | 1.7:1          |
| TG 1 | 12%           | 12%           | 1:1            |
| TG 2 | 28%           | 32%           | 1:1.14         |
| TG 3 | 12%           | 28%           | 1:2.3          |

Figure 19:
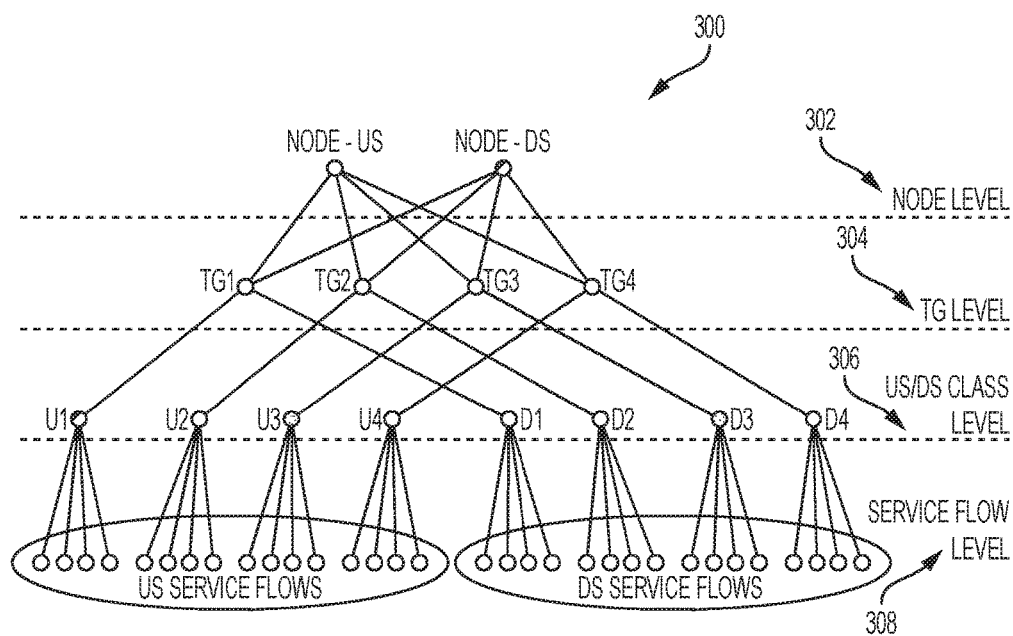
FIG. 19 illustrates an embodiment of an FDX sharing model shown as an interconnected dual tree structure.

Turning to FIG. 19, FIG. 19 illustrates an embodiment of an FDX sharing model 300 shown as an interconnected dual tree structure. In one or more embodiments, FDX resource sharing aims for one or more of work conserving scheduling to maximize spectrum utilization, complying with the simplex restriction for interference avoidance within a TG, maintaining quality of services to support service level agreements, and providing fairness among competing US and DS service flows. The roots of the FDX resource sharing model represent the total available DS and US bandwidth capacity offered by a node. The roots are connected to the service flows of either direction through intermediate aggregation points designated as transmission groups (TGs). Bandwidth consumption for both the DS and the US per TG is within the capacity offered by the simplex spectrum. the FDX sharing model 300 includes a node level 302 containing a root US node resource and a DS node resource. The directional US/DS root resource is shared by traffic of the corresponding direction from all of the participating TGs. The US node and DS node of node level 302 are each connected four transmission groups (TGs) (TG1, TG2, TG3, and TG4) of a transmission group (TG) level 304. The TGs of TG level 304 contain bi-directional US and DS traffic, where each TG is a logical interface shared by the aggregated US and DS traffic within the TG. Due to the simplex restriction, the spectrum resource allocated for the US and DS for the same TG need to be mutual exclusive.

Each of TG1, TG2, TG3, and TG4 is interconnected with a corresponding upstream (US) traffic flow aggregation point (U1, U2, U3, or U4) and a corresponding downstream (DS) traffic flow aggregation points (D1, D2, D3, or D4) located at a US/DS TG class level 306. The TG class (TC) level 306 contains unidirectional traffic aggregation within a TG. The US/DS TC is a logical interface that collects the traffic from the unidirectional US/DS service flows. In particular embodiments, bandwidth sharing within the traffic class is based on the DOCIS QoS settings of individual service flows. The US traffic flow aggregation points (U1-U4) of US/DS TC level 306 are connected to individual active US service flows of a service flow level 308. The DS traffic flow aggregation points (D1-D4) are connected to individual active DS service flows of service flow level 308. Service flow level 308 is the leaf level of the FDX sharing model 300 that contains packet queues for active DS service flows and bandwidth request queues for active US service flows.

Expressed mathematically, given that the root resource for US and DS resource at the node are represented by $U_N$ and $D_N$, respectively, and a list of traffic groups $TG_1, \ldots TG_n$, allocate a pair of disjoint spectrum blocks to each TG's DS/US class, $(U_1, D_1), \ldots (U_n, D_n)$, such that the sum of the bandwidth allocated for each DS class BW ($D_i$) and the sum of the bandwidth allocated for each US class BW($U_i$) approaches the DS root capacity $Cp(D_N)$ and the US root capacity, $Cp(U_N)$ i.e., $$\sum_{i=1}^{n} BW(U_i) \to Cp(U_N), \quad \sum_{i=1}^{n} BW(D_i) \to Cp(D_N) \qquad \text{Equation 1}$$

Assuming the spectrum efficiency in terms of bis/Hz for DS and US are $S_D$ and $S_U$, respectively, the simplex spectrum restriction requires that the sum of the bandwidth allocated for DS and US classes cannot exceed the capacity of the simplex spectrum, i.e., $$BW(U_i)+BW(D_i)*S_U/S_D \leq Cp(U_N)$$

or, $$BW(U_i)*S_D/S_U+BW(U_i) \leq Cp(D_N) \qquad \text{Equation 2}$$

In a sense, the simplex spectrum casts an upper bound on the permitted traffic rate of the DS or US TC per TG. Equation 3 shows an a procedure to bound the unidirectional bandwidth consumption using the traffic ratio between the DS and US within a TG.

$$BW(U_i) \leq \frac{BW(U_i)}{BW(U_i)+BW(D_i)S_U/S_D} * Cp(U_N) \qquad \text{Equation 3}$$

$$BW(D_i) \leq \frac{BW(D_i)}{BW(D_i)+BW(U_i)S_D/S_U} * Cp(D_N)$$

Whenever this bound is hit, bandwidth truncation occurs causing less spectrum efficiency. When there is active traffic from many TGs, the likelihood to hit this bound is low, as each TG gets a smaller portion of the bandwidth. On the other hand, for an extreme case in which there is only one TG, the DS and US load have to be truncated to half of what the duplex spectrum can offer. For example, if the DS and US traffic demand is 1, each can only get 50% of the unidirectional root resource, assuming DS and US have the same spectrum efficiency.

Figure 20:
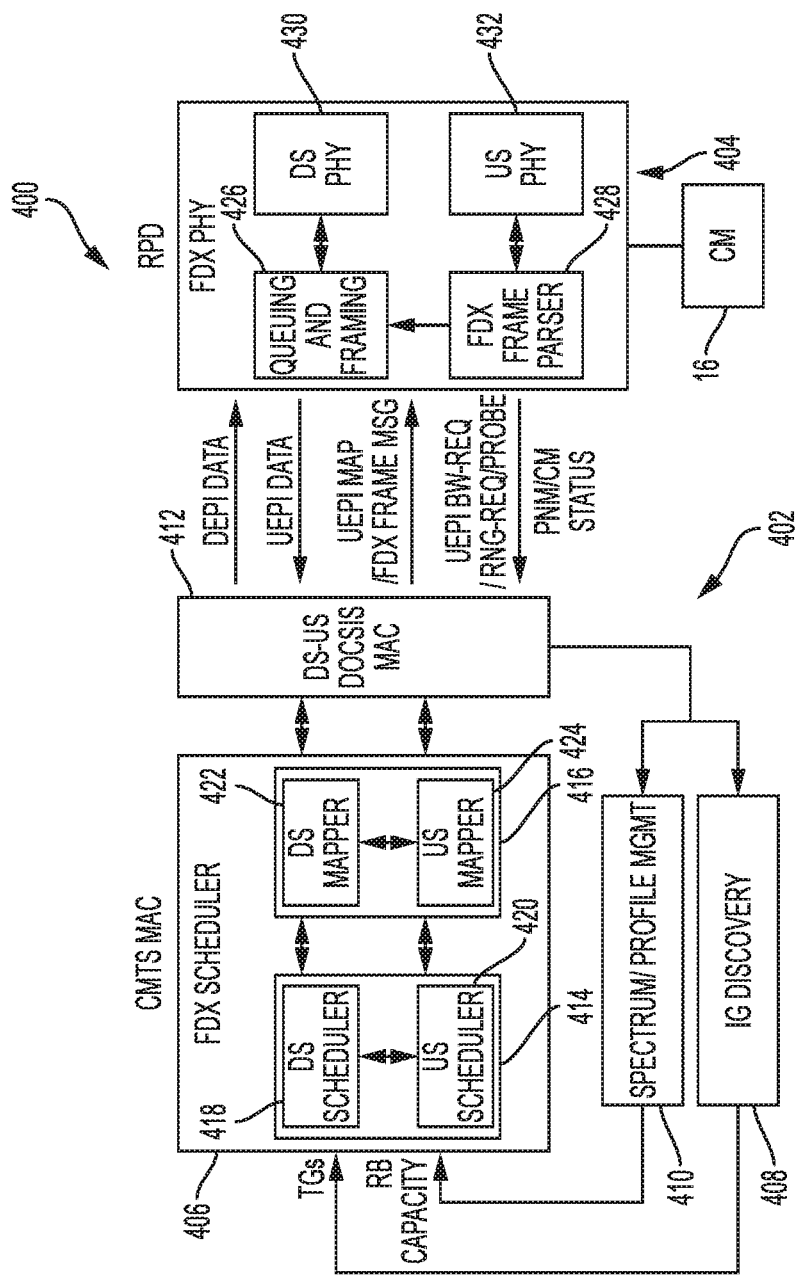
FIG. 20 is a simplified block diagram illustrating a media access control (MAC) system for full duplex resource allocation in a cable network environment according to one embodiment.

Turning now to FIG. 20, FIG. 20 is a simplified block diagram illustrating a media access control (MAC) system 400 for full duplex resource allocation in a cable network environment according to one embodiment. The MAC system 400 includes a CMTS MAC 402 in communication with a remote PHY device (RPD) 404. In one or more embodiments, CMTS MAC 402 is located within CMTS 14. In a particular embodiments, CMTS MAC 402 is co-located with remote RPD 404, for example within the same chassis. In another particular embodiment, CMTS MAC 402 is in communication with RPD 404 via a network connection such as an Ethernet or fiber connection. RPF 404 is in further communication with a cable modem (CM) 16 via a coaxial connection. Although a single CM 16 is shown in FIG. 20 for ease of illustration, it should be understood that in various embodiments multiple CMs may be coupled to RPD 404 in which one or more CMs are grouped into IGs, and the IGs are further grouped into TGs such as shown in FIG. 15. CMTS MAC 402 includes a full duplex (FDX) scheduler module 406, an IG Discovery module 408, a spectrum/profile management module 410, and a DS-US DOCSIS MAC interface 412. FDX scheduler 406 includes a quality of service (QoS) scheduler module 414 and a resource block (RB) mapper module 416. QoS scheduler module 414 includes a downstream (DS) scheduler 418 and an upstream (US) scheduler 420. RB mapper module 416 includes a DS mapper 422 and US mapper 424.

RPD 404 includes a full duplex physical interface (PHY) module having a queuing and framing module 424, an FDX frame parser module 428, a downstream (DS) physical interface 430, and an upstream (US) physical interface 432.

IG Discovery module 408 is configured to perform interference group (IG) discovery for one or more CMs. In one or more embodiments, IG Discovery module 408 interrogates the US to DS interference of the CMs to group the CMs into one or more interference groups (IGs). In one or more embodiments, A CM transmits with a known signal level, and all other CMs listen and report the received signal levels to IG Discovery module 408. Based on the reported received signal levels, IG Discovery module 408 determines the path losses among CMs and the grouping of the CMs into one or more IGs. In particular embodiments, IG Discovery module 408 interrogates the CMs by either re-using existing signaling within the DOCSIS 3.1 complex, such as PNM or uses a new signaling protocol. IG Discovery module 408 further groups the IGs into one or more logical transmission groups (TGs) and provides the transmission group information to FDX scheduler 406 to assist FDX scheduler 408 to associate a CM and its associated service flows to the TGs.

Spectrum/profile management module 410 is configured to manage physical layer provisioning of individual resource blocks (RBs) based on channel/profile measurements to assists RB mapper module 416 to calculate the bandwidth capacity of each RB based on the physical layer parameters. In particular embodiments, spectrum/profile management module 10 uses DOCSIS3.1 signaling including CM status and proactive network maintenance (PNM) reports to determine the physical layer parameters.

FDX scheduler module 406 is responsible for the FDX resource allocation based on downstream and upstream traffic needs. In traditional DOCSIS implementations, the DS scheduler and the US scheduler run as completely independent instances. In accordance with various embodiments, inter-dependencies between the DS bandwidth allocation and US bandwidth allocation introduced by the per TG simplex spectrum constraints are used to determine the FDX resource allocation through the use of an interconnection between DS scheduler module 418 and a US scheduler module 414 of QoS scheduler module 414. DS scheduler module 418 and US scheduler module 420 function as two separate unidirectional schedulers in which one of the schedulers mirrors a traffic request from the other direction on a per TG basis. Traffic mirrored from the other direction forms an upper bound to the traffic share which is calculated based on unidirectional scheduling criteria.

In one or more embodiments, the allocated bandwidth for a particular TG in the upstream direction is constrained by an upper bound that is a function of the total bandwidth capacity of the upstream direction, the allocated bandwidth in the downstream direction of the transmission group, and a ratio of the spectrum efficiency of the upstream direction and the spectrum efficiency of the downstream direction. Similarly, the allocated bandwidth for a particular TG in the downstream direction is constrained by an upper bound that is a function of the total bandwidth capacity of the downstream direction, the allocated bandwidth in the upstream direction of the transmission group, and a ratio of the spectrum efficiency of the downstream direction and the spectrum efficiency of the upstream direction. In accordance with one or more embodiments, allocated bandwidth of the upstream direction and the downstream direction of a particular transmission group (TG) is constrained by an upper bound determined according to Equation 3 as described above.

In accordance with various embodiments, traffic mirroring may be performed though self-generated, periodic bandwidth request packets that reflect the aggregated DS/US traffic rate per TG. Since the traffic mirroring is only used for a boundary check, a low update rate can be tolerated to reduce system overhead.

Resource block (RB) mapper 416 is at the MAC layer and is responsible for mapping bandwidth allocation in bytes received in bytes from DS scheduler 418 and US scheduler 420 of QoS scheduler 414 to resource blocks (RBs) based on an interference avoidance rule and the RB bandwidth capacity calculated from the PHY layer configurations obtained from spectrum/profile management module 410. In one or more embodiments, the interference avoidance rule is enforced by performing a negation/logical-not operation when assigning a RB to the downstream (DS) traffic and the upstream (US) traffic across different TGs such that the DS and US traffic from the same TG is mapped to mutually exclusive RBs. As shown in FIG. 20, a particular embodiment of RB mapper 416 includes a DS RB mapper 422 for mapping DS traffic flows, and a US RB mapper 424 for mapping US traffic flows. DS mapper 422 and US mapper 424 coordinated with the negation rule through an internal interface.

Figure 21:
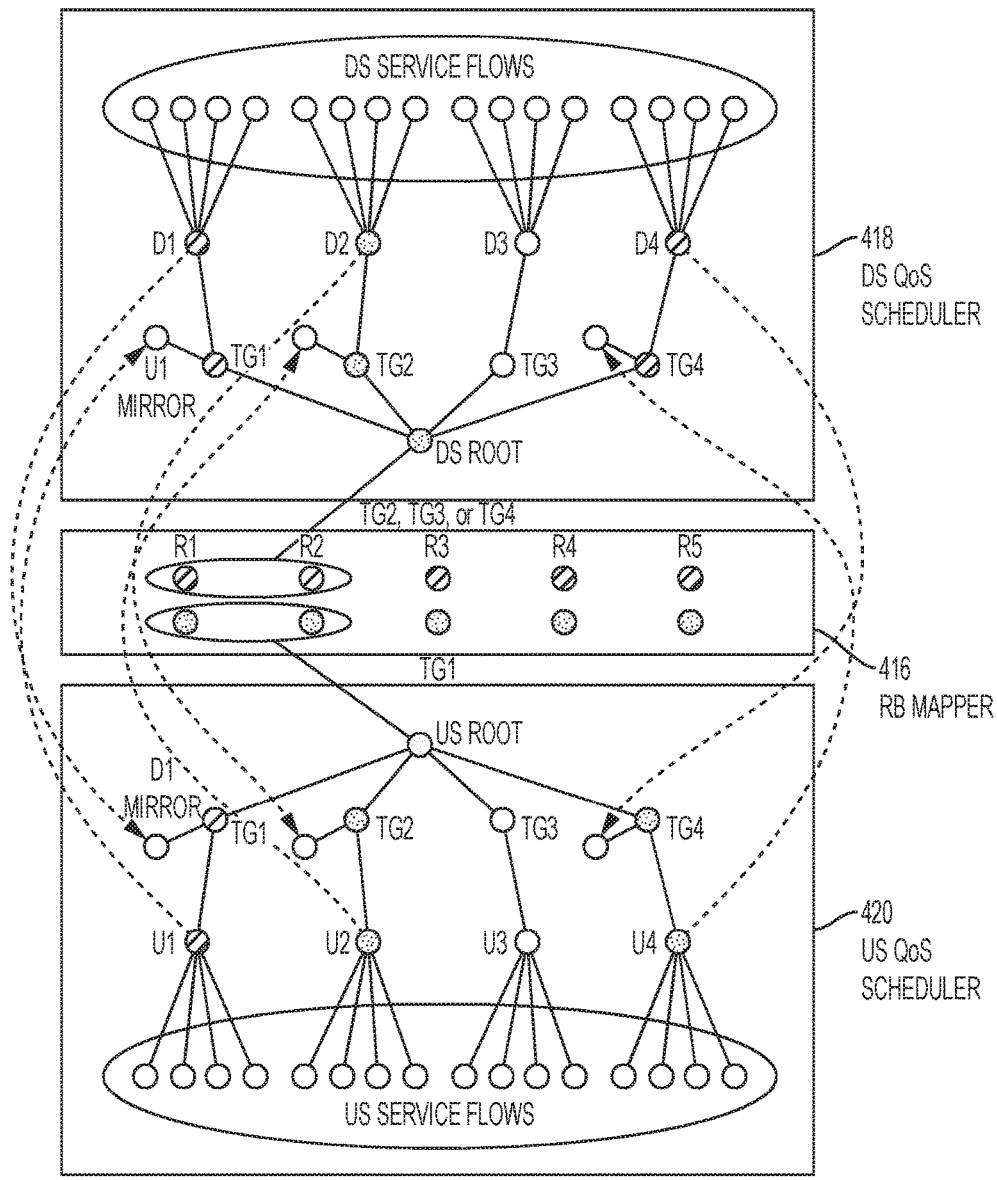
FIG. 21 illustrates an example of full duplex (FDX) resource block allocation according to one embodiment.

Turning now to FIG. 21, FIG. 21 illustrates an example of full duplex (FDX) resource block allocation according to one embodiment. DS scheduler 418 includes downstream (DS) service flows aggregated into four downstream (DS) traffic flow aggregation points (D1, D2, D3, and D4). Each of the downstream traffic aggregation points (D1, D2, D3, and D4) is associated with a respective transmission group (TG) (TG1, TG2, TG3, TG4). The transmission groups (TG1, TG2, TG3, TG4) are further connected to a DS root node. US scheduler 420 includes upstream service flows aggregated into four upstream traffic flow aggregation points (U1, U2, U3, and U4). Each of the upstream traffic aggregation points (U1, U2, D3, and U4) is associated with respective transmission group (TG) (TG1, TG2, TG3, TG4). The transmission groups (TG1, TG2, TG3, TG4) are further connected to a US root node. The DS root node and US root node are in communication with RB mapper 416. The flows associated with each TG are mirror between the US and DS in accordance with the TG simplex spectrum constraints as described above. For example, for U1 and D1 associated with TG1, the bandwidth allocations for U1 and D1 are mirrored. RB mapper 416 is shown as allocating five downstream and upstream resource blocks (RBs) (R1, R2, R3, R4, and R5) in accordance with a negation/logical-not operation as described above. For example, as shown in FIGS. 21, R1 and R2 are assigned for US traffic from TG1, and then R1 and R2 can only be used for traffic from TG1's complement, TG2, TG3 and TG4.

In one or more embodiments, an optimized packing scheme is used to match the spectrum capacity assumed by the DS scheduler 418 and US scheduler 420 of QoS Scheduler 414. For example, the least used RB may be selected first; or in case of TaFD, an entire channel may be allocated to satisfy traffic with minimum reserved rate or low latency requirement. Depending on the implementation, in various embodiments the bandwidth demands from QoS scheduler 414 may be pulled in to RB mapper 416 or pushed to RB mapper 416. In cases in which a push model is used, a per RB shaper is may be used to ensure that the scheduled rate is aligned with the mapping rate to avoid overflowing the RBs at the PHY layer.

Referring again to FIG. 20, RB mapper 416 is configured to form a map of transmission blocks (TBs) that satisfies the traffic demand for both US and DS transmissions. RB mapper 416 conveys the TB maps to remote PHY devices (RPD) 404 to instruct the PHY convergence layer operation as will be further described herein. In accordance with various embodiments, R-PHY signaling is used to convey the FDX RB mapping information from CMTS MAC 402 to RPD 404. In the case of an FDD FDX system, because each RB represents the entire DS/US channel, DS packet to RB mapping is conveyed to RPD 404 using packet to channel associations of the existing remote-PHY (R-PHY) signaling protocol.

In the case of a TDD system in which RPD needs to understand the FDX frame allocation for PHY layer operations, DS packets to RB association is achieved through (1) mapping of DS packets to TGs, and (2) mapping of a TG to transmission blocks (TBs). In at least one embodiment, mapping DS packets to TGs is conveyed using a DOCSIS Remote Downstream External PHY Interface (R-DEPI) message. In a particular embodiment, an 8-bit channel field in the R-DEPI Packet Streaming Protocol (PSP) header is encoded to associate the packet with a DS channel. This 8-bit channel field can be extended to include the TG assignment within a TG field. For example, a 3-bit TG field can be used to identify 8 TGs per channel for 32 channels. In one or more embodiments, mapping a TG to TBs uses a MAC Management Message, termed a DS Transmission Block message.

Figure 22:
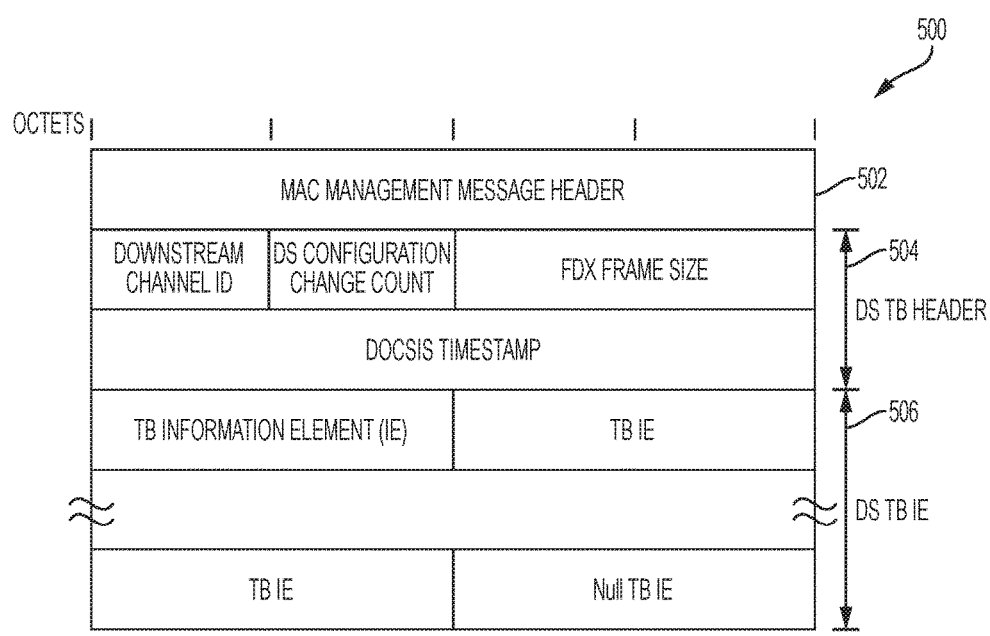
FIG. 22 illustrates an embodiment of a DS Transmission Block (TB) message format.

Turning now to FIG. 22, FIG. 22 illustrates an embodiment of a DS Transmission Block (TB) message format 500. The DS Transmission Block Message includes a MAC management header 502, a DS TB frame message header 504, and multiple DS TB Information Elements (TB IEs) 506. The MAC management header 502 indicates that the frame includes a MAC management message. The DS TB frame message header 504 includes a downstream channel ID field, a downstream configuration change count field, an FDX frame size field, and a DOCSIS timestamp field. The DS TB Information Element 506 includes one or more TB Information Element fields and a Null TB IE Field. The parameter details are described as follows:

| Field | Size (bits) | Function |
| --- | --- | --- |
| DS Channel ID | 8 | Identifier of the downstream channel to which this message refers |
| DS Configuration Change Count | 8 | Matches the value of the configuration change count of OCD which describes the DS channel parameters to which this message refers. |
| Frame Size | 16 | Frame size in unit of 64 DOCSIS3.1 clock cycles at 204.8 MHz |
| DOCSIS Timestamp | 64 | DOCSIS3.1 timestamp aligned to the frame boundary of the first frame described in this message |
| TB Information Elements (IE) | 16*n (n must be an odd number) | Describes the DS frame to TG assignment bits 15-8: starting frame offset of the TB assignment bits 7-0: TG ID (1 based, 0xFF is reserved for broadcast) |
| Null TB IE | 16 | bits 15-8: ending offset pervious TB. Used to bound length of the last actual TB. Bits 7-0: set to 0 |

Note that the TG ID 0xFF is reserved for broadcast transmission block opportunities. When TB is marked with this broadcast ID, no US transmission is allowed from any TGs. This is collectively achieved by granting NULL-SID IEs in the US MAP within the broadcast TB window.

For upstream (US) TDD, no R-PHY signaling change to existing DOCSIS is required to support TDD operation for the US direction. For the upstream direction, the RB mapping can be fully specified by an Upstream External PHY Interface (UEPI) MAP message.

Referring again to FIG. 20, the FDX PHY of RPD 404 supports a number of functionalities regardless of whether an FDD or TDD system is used which include echo cancellation and a number of transmitters and receivers to cover a wider spectrum range. In particular embodiments, CMTS MAC 402 is configured to send messages such as DEPI data, UEPI MAP messages, and FDX frame messages to the FDX PHY of RPD 404, and FDX PHY of RPD 404 is configured to send messages such as UEPI data, UEPI bandwidth request messages, ranging request messages, probe messages, PNM messages, and CM status messages to CMTS MAC 402. FDX PHY includes a queuing and framing module 426, an FDX frame parser 428, a DS PHY layer 430, and a US PHY layer 452. Queuing and framing module 426 is configured to queue messages within profile buffers and construct frames for transmission of US and DS packets. DS PHY layer 430 includes a code word builder to convert packets into code words and symbols, forming a continuous bitstream interleaved in frequency and time for sending to CM 16. US PHY layer 452 is configured to receive signals from CM 16 and decode the signals into packets to be passed to FDX frame parser 428. FDX frame parser 428 parses frames from the upstream direction and passes the frames to queuing and framing module 426 for sending to CMTS MAC 402.

In one or more embodiments, RPD 404 uses signaling, such as DOCSIS 3.1 signaling, in order for CM 16 to recognize its TBs allocated by CMTS MAC 402. For a FDD system, a TB is represented as a bonding group supported with existing DOCSIS signaling. For TDD upstream (US) operation, a TB is conveyed through minislot mapping as in existing DOCSIS MAP messages. For TDD downstream (DS) operation, the CM needs to understand when to receive the DS packets and when to ignore the received signal due to US interference. In particular embodiments, this is achieved by using the DS Transmission Block message as described with respect to FIG. 22. The DS Transmission Block (TB) message is sent to CM 16 on a primary DS channel together with US MAP messages, accessible to the CM at any time. Since the DS TB message can be sent to CM 16 before the actual DS TB arrives, CM 16 may use this knowledge for interference mitigation by shutting down the components that may be impacted by the US transmission and take a longer time to recover, for example to prevent automatic gain control (AGC) from being saturated by the high-powered interference signals. Since the TB is marked with a TG ID, CM 16 needs to know the TG assignment in order to identify the associated TBs. In particular embodiments, this is achieved by adding a new TG TLV to the DOCSIS3.1 Receive Channel Configuration (RCC) message to convey the TG assignment.

Figure 23:
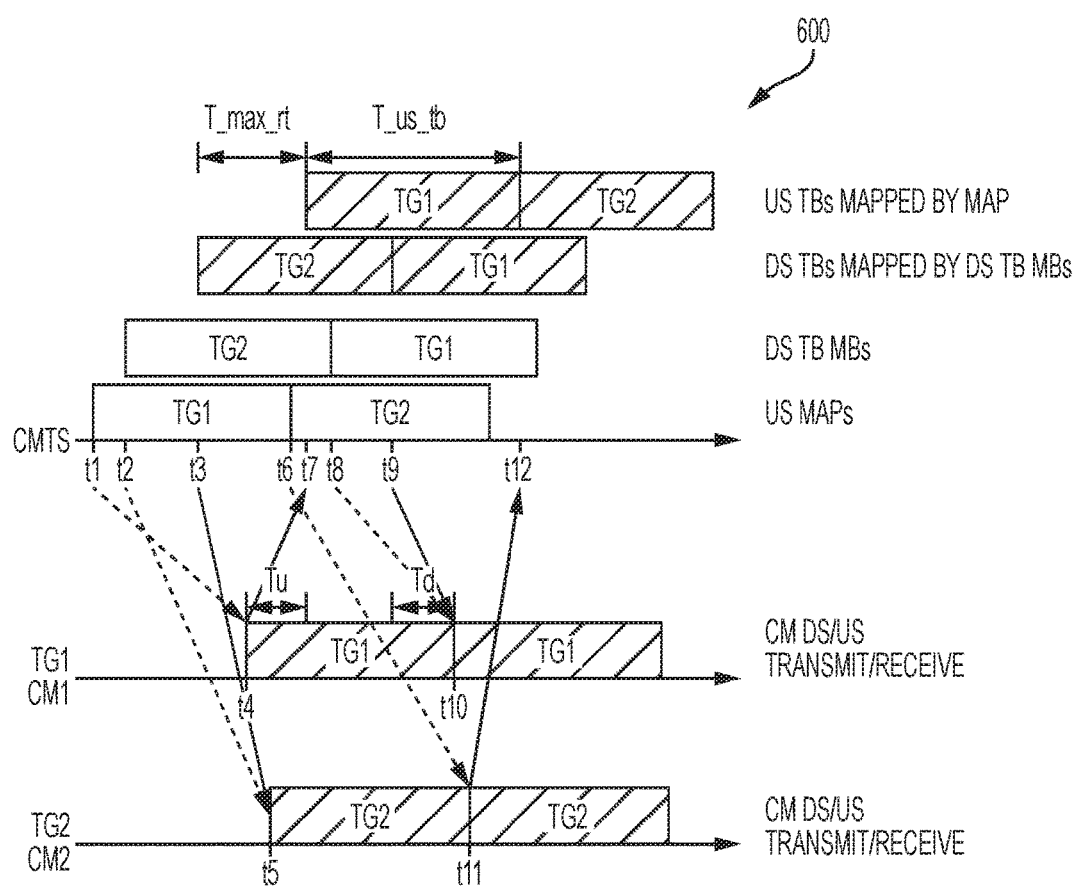
FIG. 23 is an example of a simplified TDD FDX timing protocol according to one embodiment.

Turning now to FIG. 23, FIG. 23 is an example of a simplified TDD FDX timing protocol according to one embodiment. FIG. 23 illustrates a timing interchange between CMs and the CMTS is a TDD FDX system. DS TB message blocks are used to communicate the DS transmission block opportunities from the CMTS to the CMs. US MAP messages are used to communicate the US transmission block opportunities to the CMs.

Assuming a first CM (CM1) is in a first transmission group (TG1, and a second CM (CM2) is in a second transmission group (TG2), the following operations are performed:

1. At time t1, the CMTS transmits a MAP message containing a grant for TG1, whose effective start time begins at t7. The difference between t1 and t7 is needed to allow for MAP processing and round trip propagation delays. Similarly, the CMTS transmits a MAP message containing a grant for TG2 at t6, whose effective start time is at t12.

2. At time t2, the CMTS transmits a DS TB message for TG2, whose effective start time is at t3 at the CMTS. The offset between t7 and t3, which may be set to the maximum round trip propagation delay, $t7-t3=T\_max\_rt$ to minimize the intersymbol interference (ISI) at the furthest CM. Similarly, at t8, the CMTS transmits a DS TB message for TG1, whose effective start time is at t9.

3. At time t4, CM1 receives the grant and starts the upstream transmission to reach the CMTS at t7, $t4=t7-Tu$, where Tu is the US propagation delay. Similarly, at time t11, CM2 receives the grant and starts the upstream transmission to reach CMTS at t12.

4. At Time t5, CM2 receives its DS TB directed by the DS TB message block. Similarly, at t10, CM1 receives its DS TB directed by the DS TB message block. $t10=t9+Td$, where Td is the DS propagation delay.

$t9=t12-T\_max\_rg$
$t10=t9+Td$
$t4=t7-Tu$

Note that if time is perfectly aligned, $t10-t4=t12-t7=T\_grant$,
And,
$Td+Tu=T\_max\_rt$ By setting the DS and US transmission offset to T_max_rt, perfect alignment may be achieved at the furthest CM, with quasi-alignment at other modems within the CP window.

Figure 24:
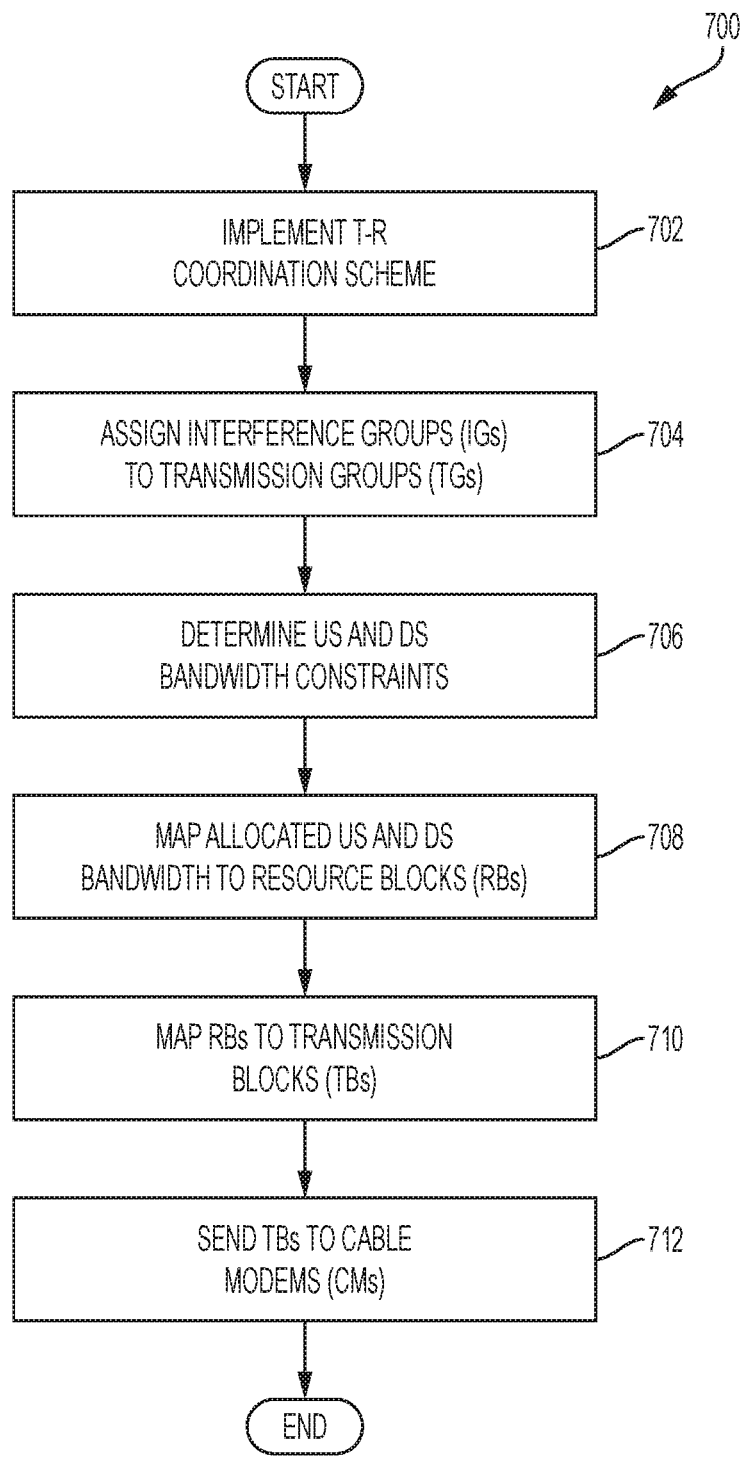
FIG. 24 is a simplified flow diagram illustrating example operations that may be associated with an embodiment of the communication system.

Turning now to FIG. 24, FIG. 24 is a simplified flow diagram illustrating example operations 700 that may be associated with an embodiment of the communication system. An apparatus including a processor, memory element, and a media access control (MAC) scheduler, such as FDX scheduler 406, is configured to perform operations associated with full duplex resource allocation in a cable network environment. In 702, the MAC scheduler is configured implements a transmission-reception (T-R) coordination scheme among a plurality of cable modems in the cable network. According to the T-R coordination scheme, the cable modems are categorized into interference groups, wherein no cable modem of any one interference group transmits upstream in a frequency range simultaneously as another cable modem in the same interference group receives downstream in the frequency range, facilitating full duplex communication in the cable network across the frequency range. In particular embodiments, the MAC scheduler includes a downstream scheduler interconnected with an upstream scheduler. In other particular embodiments, the apparatus includes a cable modem termination system (CMTS).

In 704, the MAC scheduler assigns one or more of the interference groups to at least one transmission group based upon predetermined criteria. In 706, the MAC scheduler determines an upstream bandwidth constraint and downstream bandwidth constraint for the at least one transmission group. The upstream bandwidth constraint and downstream bandwidth constraint is implemented by proportionally modifying an allocated upstream bandwidth and an allocated downstream bandwidth for the at least one transmission group to require that the sum of the allocated upstream bandwidth and allocated downstream bandwidth does not exceed a spectrum capacity for the at least one transmission group.

In 708, the MAC scheduler maps the allocated upstream bandwidth and allocated downstream bandwidth to one or more resource blocks in association with the at least one transmission group. In one or more embodiments, the mapping of the allocated upstream bandwidth and allocated downstream bandwidth is based upon an interference avoidance rule and a resource bandwidth of the one or more resource blocks. In particular embodiments, the interference avoidance rule includes a negation rule such that downstream traffic and upstream traffic from the same transmission group is mapped to mutually exclusive resource blocks.

In 710, the MAC scheduler maps the one or more resource blocks to one or more transmission blocks in association with the at least one transmission group. The one or more transmission blocks includes an indication of the association of the one or more resource blocks with the at least one transmission group. In 712, the MAC scheduler sends the mapping of the resource blocks to the transmission blocks to at least one of the plurality of cable modems. The operations then end.

Various embodiments may provide one or more of the following advantages: (1) Enabling DCOSIS operation in TDD mode; (2) enabling FDX DOCSIS operation with bidirectional traffic occupying the same spectrum at the same time; (3) the centralized FDX scheduling scheme removes the complexity from PHY and CMs, and adds value to CCAP core products; (4) the centralized FDX scheduling has better QoS control and better spectrum efficiency; (5) the RB mapper provides for immediate rate control to the QoS scheduler, and resolves the MAC and PHY rate misalignment issue presented in existing R-PHY systems; (6) the R-PHY signaling modification allows the RPHY to synchronize DS and US transmission without the complexity of DS and US resource alignment; and (7) the DOCSIS signaling modification allows the FDX CMs to anticipate the interference by proactively shutting down the RF front end or any circuit that may be impacted by an unwanted US transmission.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, CMTS 14, MAC scheduler 26, and CMs 16a-16e. In some embodiments, one or more of these features may be implemented in hardware, provided external to these elements, or consolidated in any appropriate manner to achieve the intended functionality, for example amplifiers 20 and transceiver 18. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, CMTS 14, MAC scheduler 26, amplifier 20, transceiver 18, and CMs 16a-16e described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 27, DSP 170, DSP 228) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication systems 10 and 122 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication systems 10 and 122 may be applicable to other exchanges or routing protocols. Moreover, although communication systems 10 and 122 have been illustrated with reference to particular elements and operations that facilitate the communication process, these elements, and operations may be replaced by any suitable architecture or process that achieves the intended functionality of communication systems 10 and 122.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus in a cable network, comprising:
    a processor;
    a memory element; and
    a media access control (MAC) scheduler, wherein the MAC scheduler is configured to:
        implement a transmission-reception (T-R) coordination scheme among a plurality of cable modems in the cable network, wherein according to the T-R coordination scheme, the cable modems are categorized into interference groups, wherein no cable modem of any one interference group transmits upstream in a frequency range simultaneously as another cable modem in the same interference group receives downstream in the frequency range, facilitating full duplex communication in the cable network across the frequency range;

assign one or more of the interference groups to at least one transmission group based upon predetermined criteria; and determine an upstream bandwidth constraint and downstream bandwidth constraint for the at least one transmission group, wherein the upstream bandwidth constraint and downstream bandwidth constraint is implemented by proportionally modifying an allocated upstream bandwidth and an allocated downstream bandwidth for the at least one transmission group to require that the sum of the allocated upstream bandwidth and allocated downstream bandwidth does not exceed a spectrum capacity for the at least one transmission group, wherein the upstream bandwidth constraint comprises an upstream upper bound that is a function of a total bandwidth capacity of an upstream direction, the allocated downstream bandwidth for the at least one transmission group, and a ratio of a spectrum efficiency of the upstream direction and a spectrum efficiency of a downstream direction and wherein the downstream bandwidth constraint comprises a downstream upper bound that is a function of a total bandwidth capacity of a downstream direction, the allocated upstream bandwidth for the at least one transmission group, and a ratio of the spectrum efficiency of the downstream direction and the spectrum efficiency of the upstream direction.

2. The apparatus of claim 1, wherein MAC scheduler is further configured to map the allocated upstream bandwidth and allocated downstream bandwidth to one or more resource blocks in association with the at least one transmission group.

3. The apparatus of claim 2, wherein the mapping of the allocated upstream bandwidth and allocated downstream bandwidth is based upon an interference avoidance rule and a resource bandwidth of the one or more resource blocks.

4. The apparatus of claim 3, wherein the interference avoidance rule includes a negation rule such that downstream traffic and upstream traffic from the same transmission group is mapped to mutually exclusive resource blocks.

5. The apparatus of claim 2, wherein the MAC scheduler is further configured to map the one or more resource blocks to one or more transmission blocks in association with the at least one transmission group, wherein the one or more transmission blocks includes an indication of the association of the one or more resource blocks with the at least one transmission group.

6. The apparatus of claim 5, wherein the MAC scheduler is further configured to send the mapping of the resource blocks to the transmission blocks to at least one of the plurality of cable modems.

7. The apparatus of claim 1, wherein the MAC scheduler includes a downstream scheduler interconnected with an upstream scheduler.

8. The apparatus of claim 1, wherein the apparatus includes a cable modem termination system (CMTS).

9. A method, comprising:
implementing, by a media access control (MAC) scheduler in a cable network, a
transmission-reception (T-R) coordination scheme among a plurality of cable modems in the cable network, wherein according to the T-R coordination scheme, the cable modems are categorized into interference groups, wherein no cable modem of any one interference group transmits upstream in a frequency range simultaneously as another cable modem in the same interference group receives downstream in the frequency range, facilitating full duplex communication in the cable network across the frequency range;

assigning one or more of the interference groups to at least one transmission group based upon predetermined criteria; and determining an upstream bandwidth constraint and downstream bandwidth constraint for the at least one transmission group, wherein the upstream bandwidth constraint and downstream bandwidth constraint is implemented by proportionally modifying an allocated upstream bandwidth and an allocated downstream bandwidth for the at least one transmission group to require that the sum of the allocated upstream bandwidth and allocated downstream bandwidth does not exceed a spectrum capacity for the at least one transmission group, wherein the upstream bandwidth constraint comprises an upstream upper bound that is a function of a total bandwidth capacity of an upstream direction, the allocated downstream bandwidth for the at least one transmission group, and a ratio of a spectrum efficiency of the upstream direction and a spectrum efficiency of a downstream direction and wherein the downstream bandwidth constraint comprises a downstream upper bound that is a function of a total bandwidth capacity of a downstream direction, the allocated upstream bandwidth for the at least one transmission group, and a ratio of the spectrum efficiency of the downstream direction and the spectrum efficiency of the upstream direction.

10. The method of claim 9, further comprising mapping the allocated upstream bandwidth and allocated downstream bandwidth to one or more resource blocks in association with the at least one transmission group.

11. The method of claim 10, wherein the mapping of the allocated upstream bandwidth and allocated downstream bandwidth is based upon an interference avoidance rule and a resource bandwidth of the one or more resource blocks.

12. The method of claim 11, wherein the interference avoidance rule includes a negation rule such that downstream traffic and upstream traffic from the same transmission group is mapped to mutually exclusive resource blocks.

13. The method of claim 10, further comprising mapping the one or more resource blocks to one or more transmission blocks in association with the at least one transmission group, wherein the one or more transmission blocks includes an indication of the association of the one or more resource blocks with the at least one transmission group.

14. The method of claim 13, further comprising sending the mapping of the resource blocks to the transmission blocks to at least one of the plurality of cable modems.

15. The method of claim 9, wherein the MAC scheduler includes a downstream scheduler interconnected with an upstream scheduler.

16. Non-transitory tangible computer-readable media that includes instructions for execution, which when executed by a processor, is operable to perform operations comprising:
implementing, by a media access control (MAC) scheduler in a cable network, a
transmission-reception (T-R) coordination scheme among a plurality of cable modems in the cable network, wherein according to the T-R coordination scheme, the cable modems are categorized into interference groups, wherein no cable modem of any one interference group transmits upstream in a frequency range simultaneously as another cable modem in the same interference group receives downstream in the frequency range, facilitating full duplex communication in the cable network across the frequency range;

assigning one or more of the interference groups to at least one transmission group based upon predetermined criteria; and determining an upstream bandwidth constraint and downstream bandwidth constraint for the at least one transmission group, wherein the upstream bandwidth constraint and downstream bandwidth constraint is implemented by proportionally modifying an allocated upstream bandwidth and an allocated downstream bandwidth for the at least one transmission group to require that the sum of the allocated upstream bandwidth and allocated downstream bandwidth does not exceed a spectrum capacity for the at least one transmission group, wherein the upstream bandwidth constraint comprises an upstream upper bound that is a function of a total bandwidth capacity of an upstream direction, the allocated downstream bandwidth for the at least one transmission group, and a ratio of a spectrum efficiency of the upstream direction and a spectrum efficiency of a downstream direction and wherein the downstream bandwidth constraint comprises a downstream upper bound that is a function of a total bandwidth capacity of a downstream direction, the allocated upstream bandwidth for the at least one transmission group, and a ratio of the spectrum efficiency of the downstream direction and the spectrum efficiency of the upstream direction.

17. The media of claim 16, wherein the operations further comprise mapping the allocated upstream bandwidth and allocated downstream bandwidth to one or more resource blocks in association with the at least one transmission group.

18. The media of claim 17, wherein the mapping of the allocated upstream bandwidth and allocated downstream bandwidth is based upon an interference avoidance rule and a resource bandwidth of the one or more resource blocks.

19. The media of claim 18, wherein the operations further comprise mapping the one or more resource blocks to one or more transmission blocks in association with the at least one transmission group, wherein the one or more transmission blocks includes an indication of the association of the one or more resource blocks with the at least one transmission group.

20. The media of claim 19, wherein the operations further comprise sending the mapping of the resource blocks to the transmission blocks to at least one of the plurality of cable modems.

* * * * *